(12) United States Patent
Steinetz et al.

(10) Patent No.: US 7,497,443 B1
(45) Date of Patent: Mar. 3, 2009

(54) RESILIENT FLEXIBLE PRESSURE-ACTIVATED SEAL

(75) Inventors: Bruce M. Steinetz, Westlake, OH (US); Patrick H. Dunlap, Jr., Wickliffe, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 277 days.

(21) Appl. No.: 11/121,850

(22) Filed: May 3, 2005

(51) Int. Cl.
*F16J 15/02* (2006.01)
(52) U.S. Cl. .................. 277/644; 277/647; 277/652
(58) Field of Classification Search ............. 277/644, 277/647, 652, 653
See application file for complete search history.

(56) References Cited

U.S. PATENT DOCUMENTS

| | | | |
|---|---|---|---|
| 2,571,817 A | 10/1951 | Armstrong | |
| 3,113,526 A | 12/1963 | Paschke | |
| 3,199,878 A | 8/1965 | Cunningham et al. | |
| 3,843,138 A | 10/1974 | Cobb | |
| 3,894,742 A | 7/1975 | Trelease | |
| 4,090,720 A | 5/1978 | Morsbach et al. | |
| 4,133,542 A | 1/1979 | Janian et al. | |
| 4,508,356 A | 4/1985 | Janian | |
| 4,561,662 A * | 12/1985 | de Villepoix et al. | 277/644 |
| 4,602,888 A * | 7/1986 | Court et al. | 403/28 |
| 4,603,892 A * | 8/1986 | Abbes et al. | 285/336 |
| 4,645,217 A | 2/1987 | Honeycutt, Jr. et al. | |
| 4,915,397 A | 4/1990 | Nicholson | |
| 5,014,917 A | 5/1991 | Sirocky et al. | |
| 5,240,769 A | 8/1993 | Ueda et al. | |
| 5,332,239 A | 7/1994 | Steinetz et al. | |
| 5,354,072 A | 10/1994 | Nicholson | |
| 5,657,998 A | 8/1997 | Dinc et al. | |
| 6,039,325 A | 3/2000 | Steinetz et al. | |
| 6,056,291 A * | 5/2000 | Inagaki et al. | 277/314 |

(Continued)

OTHER PUBLICATIONS

"Seal." Def.2c2. The Merriam-Webster's Collegiate Dictionary. 10th ed. 1999.*

(Continued)

*Primary Examiner*—Patricia L Engle
*Assistant Examiner*—Gilbert Y Lee
(74) *Attorney, Agent, or Firm*—Ralph E. Jocke; Daniel D. Wasil; Walker & Jocke

(57) ABSTRACT

A resilient, flexible, pressure-activated, high-temperature seal is adapted to be interposed between high and low pressure regions to provide sealing between opposing surfaces of adjacent relatively movable structures. The seal comprises at least one C-shaped sheet element. The C-shaped element design enables the seal to be pressure-activated to provide a radially outward biasing force, responsive to a seal-activating pressure differential acting across the seal thereby increasing resiliency. A centrally-located, resilient core structure provides load bearing and insulating properties. In an exemplary embodiment where at least two seal elements are used, each layer has a cutout slot pattern and the remaining strip material pattern. The slots provide flexibility to the seal, enabling the seal to be manually contoured to seal around corners and curves. The strip material of each layer covers the slots in each adjacent layer to minimize leakage through the slots. Attached barrier strips can block interface leakage between the seal and the opposing surfaces.

24 Claims, 15 Drawing Sheets

U.S. PATENT DOCUMENTS

| | | | |
|---|---|---|---|
| 6,098,989 | A | 8/2000 | Caplain et al. |
| 6,637,752 | B2 * | 10/2003 | Aksit et al. ................. 277/416 |
| 2005/0082768 | A1 * | 4/2005 | Iguchi et al. ................ 277/591 |
| 2005/0206097 | A1 * | 9/2005 | Datta ......................... 277/644 |

OTHER PUBLICATIONS

Steinetz, B.M., Adams, M.L., Bartolotta, P.A., Darolia, R., and Olsen, A., "High Temperature Braided Rope Seals for Static Sealing Applications," NASA TM-107233, rev., Jul. 1996.

Steinetz, B.M., and Adams, M.L., "Effects of Compression, Staging, and Braid Angle on Braided Rope Seal Performance," NASA TM-107504, Jul. 1997.

Dunlap, P.H., Steinetz, B.M., and Curry, D.M., "Rudder/Fin Seal Investigations for the X-38 Re-Entry Vehicle," NASA TM-210338, Nov. 2000.

* cited by examiner

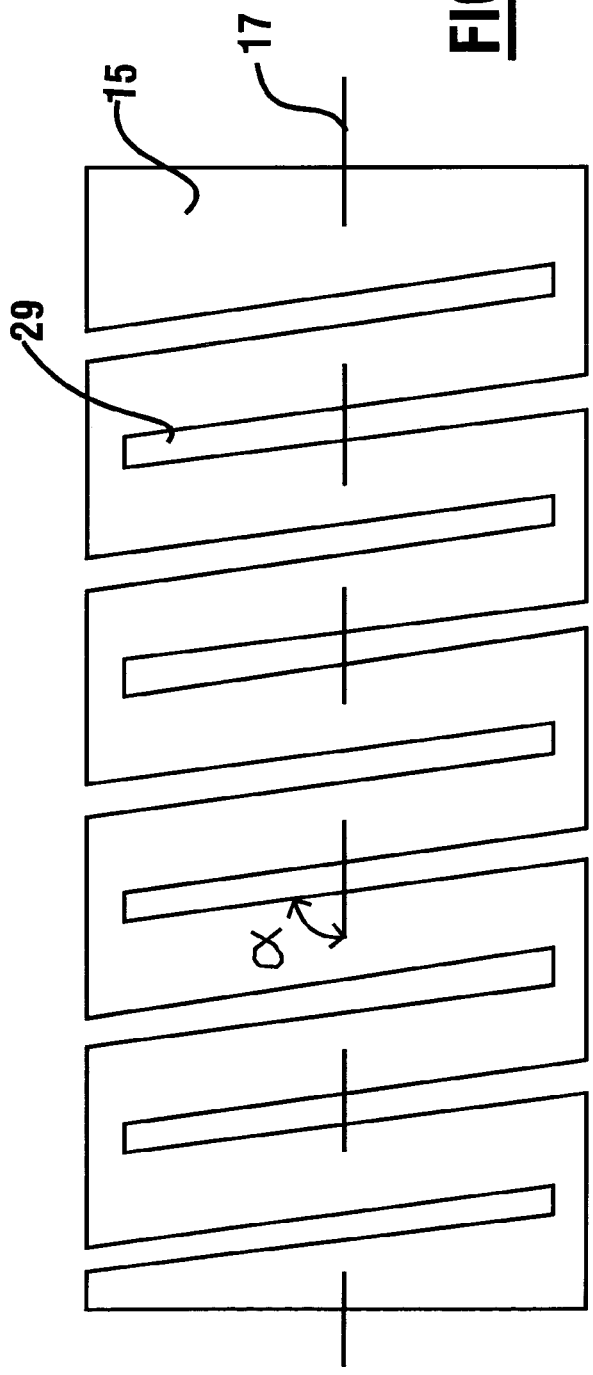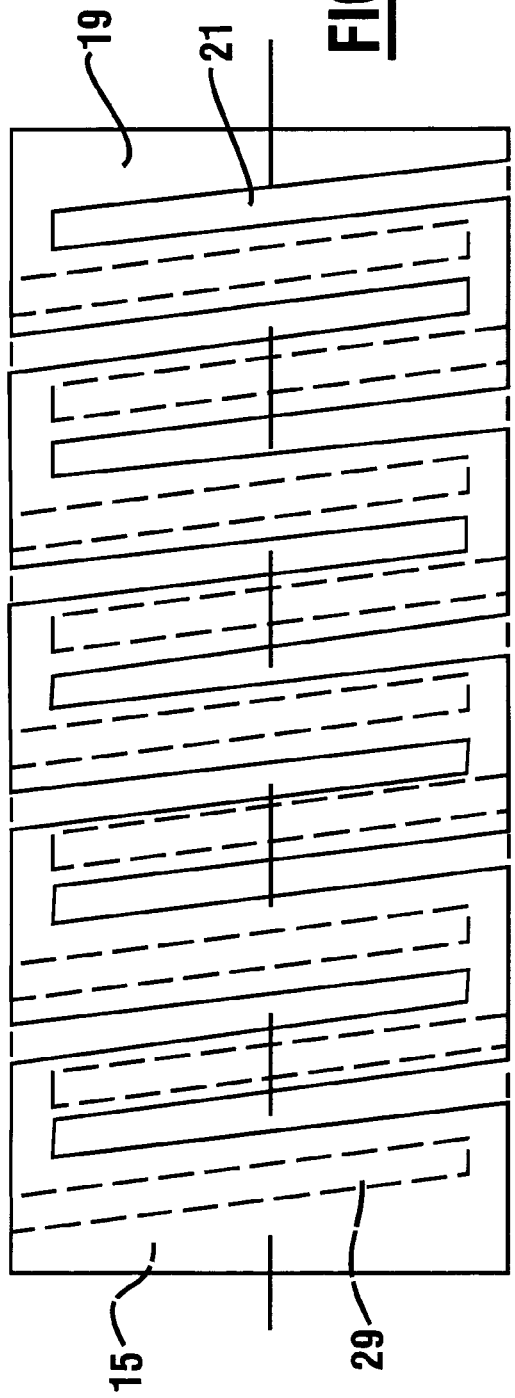

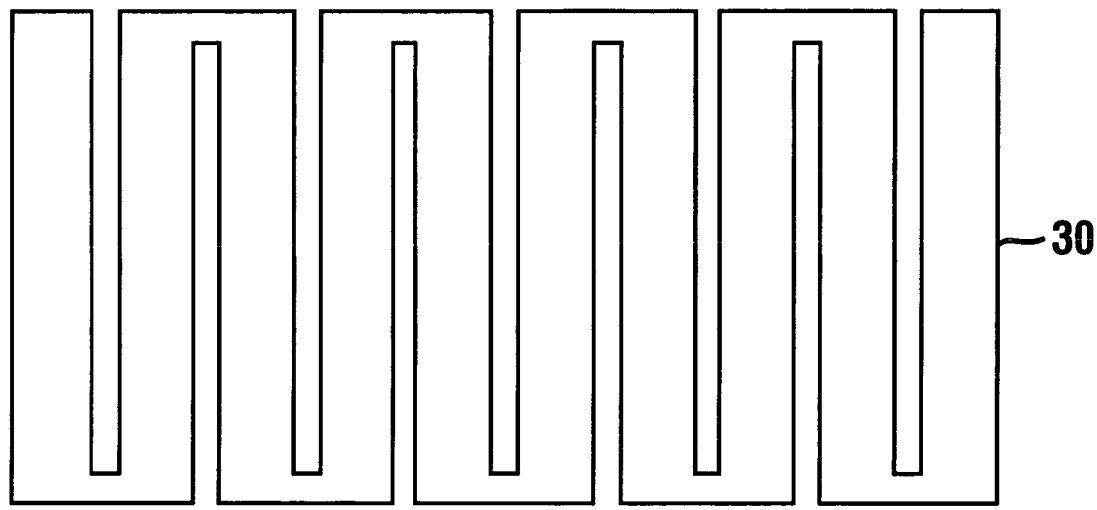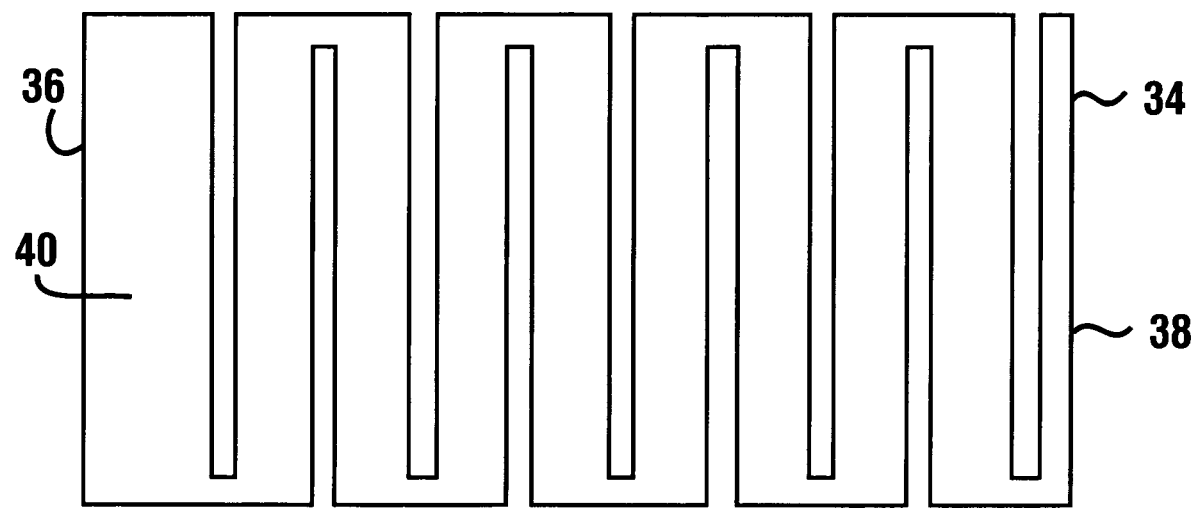
FIG. 9

RESILIENT FLEXIBLE PRESSURE-ACTIVATED SEAL

ORIGIN OF THE INVENTION

The invention described herein was made by employees of the United States Government and may be manufactured and used by or for the Government of the United States of America for government purposes without the payment of any royalties thereon or therefor.

TECHNICAL FIELD

This invention relates in general to a sealing apparatus. More particularly, this invention relates to a resilient seal apparatus capable of sealing the interface between two structures.

BACKGROUND OF THE INVENTION

Advanced aerospace vehicles and engines require resilient seals capable of blocking high temperature flow. Pressure and thermal loads can cause movements between adjoining elements that can be both in-plane and out-of-plane. Thermal distortions can be caused by temperature gradients and differences in coefficients of thermal expansion (CTE) between adjoining elements. These movements can change the size of gaps between components that the seals are required to seal. These conditions require seals that can withstand and block high temperature gases while tracking the movements of adjacent structural components. Additionally, the seals must be flexible and capable of sealing around corners and curved structures.

Conventional braided rope seals composed of ceramics and superalloys provide adequate flow-blocking characteristics for advanced gas turbine applications up to 2000 F. However, these seal designs exhibit significant permanent set and hysteresis when subjected to repeated load cycles at high temperatures. Thermal barriers being considered for space vehicle re-entry control surface seals may exhibit considerable permanent set after 1900 F temperature exposure. The seals may fail to return to their original shape and diametral height after load cycling.

DISCLOSURE OF INVENTION

Thus, there exists a need for advanced seals that exhibit higher levels of resiliency without sacrificing flexibility, temperature endurance, and flow-blocking capabilities.

It is an object of an exemplary form of the present invention to provide a seal structure that can maintain seal resiliency and flexibility while blocking hot gas flow.

It is a further object of an exemplary form of the present invention to provide a resilient, flexible, high-temperature seal.

It is a further object of an exemplary form of the present invention to provide a pressure-activated seal that can be interposed between relatively high and low pressure areas.

It is a further object of an exemplary form of the present invention to provide a pressure-activated seal that can be interposed between relatively high and low pressure cavities to provide sealing.

It is a further object of an exemplary form of the present invention to provide a pressure-activated seal capable of sealing the interface between two structures throughout multiple heating and loading cycles.

It is a further object of an exemplary form of the present invention to provide a pressure-activated seal capable of sealing the interface between spaced elements that move relative to one another within or out of plane.

It is a further object of an exemplary form of the present invention to provide a resilient, flexible, pressure-activated, high-temperature seal.

It is a further object of an exemplary form of the present invention to provide a resilient, flexible, pressure-activated, high-temperature seal that can be interposed between an upstream region of relatively high fluid pressure and a downstream region of relatively lower fluid pressure to inhibit fluid flow therebetween.

Further objects of exemplary forms of the present invention will be made apparent in the following Best Mode for Carrying Out Invention and the appended claims.

The foregoing objects are accomplished in an exemplary form of the present invention by an apparatus and method for sealing the interface between two structures. The apparatus includes a resilient, flexible, pressure-activated seal. The seal can comprise plural layers. Each layer comprises a seal element. Each seal element can include a thin sheet of material having a pattern of slots therein and remaining strips of sheet material. Each seal element is formed into a C-shaped configuration in cross section. Each seal element is arranged radially adjacent to another seal element. The seal elements are layered relative to each other so that the strip material in each seal element covers the slots in each adjacent seal element. The seal elements include portions that are operative to move relative to adjacent structural components. The innermost C-shaped seal element bounds an inner core volume. A core structure can be located in the inner volume to provide additional load bearing, resiliency, flow-blocking, and thermal insulation properties to the seal.

An exemplary form of the sealing method includes positioning the seal between spaced structural components and between a relatively high fluid pressure upstream area or region and a relatively lower fluid pressure downstream area or region. Biasing of the seal into sealing engagement with the sealing interfaces of the respective structural components is accomplished responsive to a pressure differential force across the seal attaining a seal-activating level. The movable portions of the sealing elements are biased by fluid pressure in a radially outward sealing direction. The resilient, flexible construction is effective to provide sealing between structural components that are movable relative to one another through multiple heating and loading cycles. Positioning of the seal can include bending the flexible seal around corners and curves.

BRIEF DESCRIPTION OF DRAWINGS

FIG. 4 shows a seal element with angled slots.

FIG. 5 shows an arrangement of seal elements with angled slots.

FIG. 9 shows a layer arrangement of adjacent sealing elements.

BEST MODE FOR CARRYING OUT INVENTION

An exemplary embodiment of a seal apparatus (which hereinafter may alternatively be referred to as "seal" or "seal device" or "sealing device") of the present invention includes one or more layers of seal elements. Each seal element or sealing element comprises a thin (e.g., 0.001 to 0.100 in.) sheet of material having slots or openings.

Figure 2:
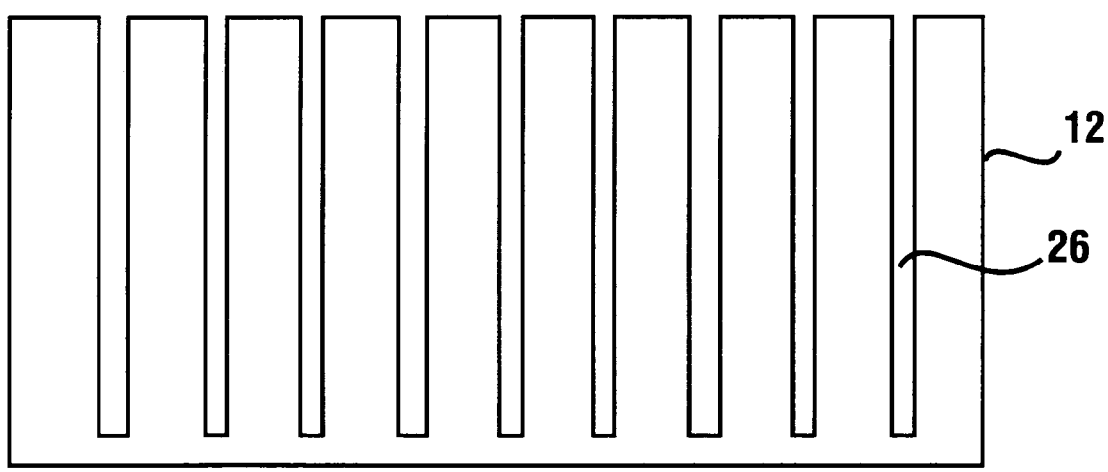
FIG. 2 shows a seal element with another slot pattern.
Figure 3:
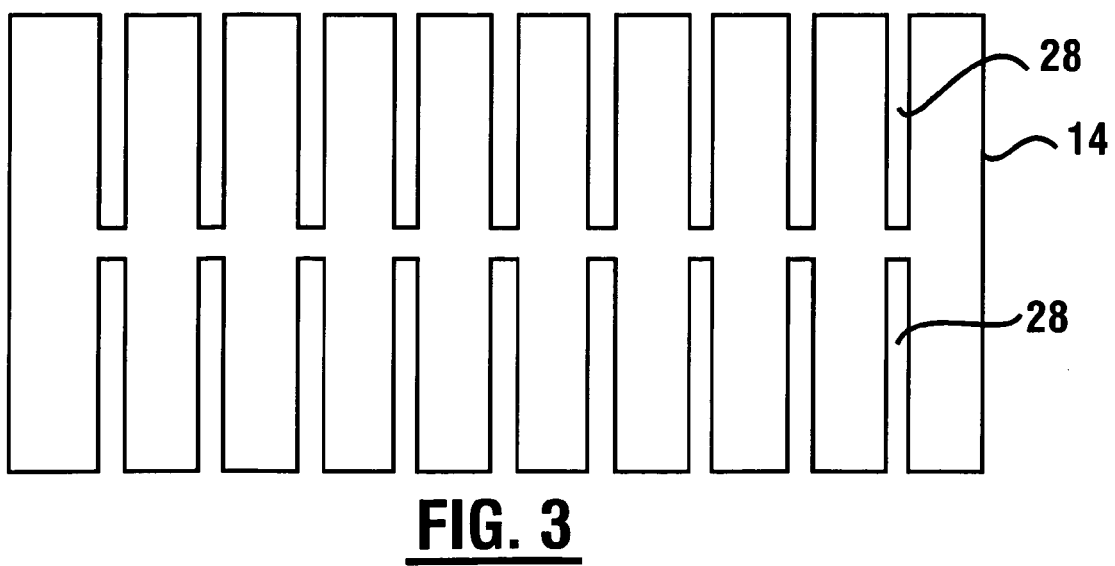
FIG. 3 shows a seal element having an alternative slot pattern.

The slots may be formed through narrow cuts made in the seal element sheets or formed through other suitable processes. The slots may be formed in a seal element in a variety of configurations. The slots can constitute a slot pattern. For example, different slot patterns are shown in the seal elements 10, 12, 14, 15 of respective FIGS. 1, 2, 3, and 4. In the slot pattern 18 of the seal element 10 shown in FIG. 1, the cuts or slots 20 extend on alternating sides of the seal element 10 so that the remaining strips 22 of material form a serpentine or S-shaped pattern or configuration 24 (along the length thereof). The seal element 12 of FIG. 2 has slots 26 and a single-sided comb configuration. The seal element 14 of FIG. 3 has slots 28 and a double-sided comb configuration. The seal element 15 of FIG. 4 is similar to the seal element 10 of FIG. 1 except that the slots 29 are angled. For example, as shown by angle, the slots 29 are non-perpendicular with the longitudinal axis 17 of the sealing element 15. It should also be understood that other slot patterns, such as those shown in FIGS. 2 and 3, may also comprise angled slots. FIG. 5 shows the seal element 15 stacked or layered adjacent to another seal element 19 that has angled slots 21. The angled slots 29 are shown in outline in FIG. 5.

A slot pattern may be produced in a seal element for example by cutting (e.g., laser cutting or water jet cutting), machining, stamping, wire EDM, green process forming, chemical etching, or other known slot producing methods. The slots may also be formed during molding and casting of material in the process of forming a sheet. That is, the slots may be formed during sheet forming, without the need for cutting. Of course such approaches are exemplary. Further, in alternative embodiments the functions provided by the slots may be achieved by other sheet features such as for example areas in the sheet of reduced thickness or areas of a more readily deformable material. For purposes of this disclosure such alternative approaches shall also be referred to herein as slots.

Figure 1:
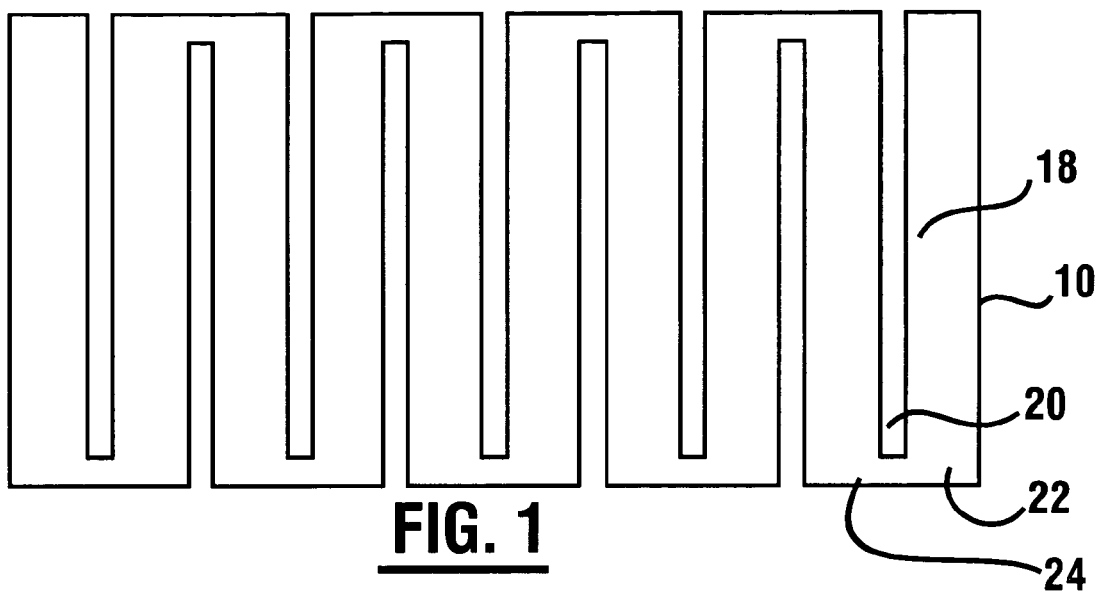
FIG. 1 shows a slotted seal element.
Figure 6:
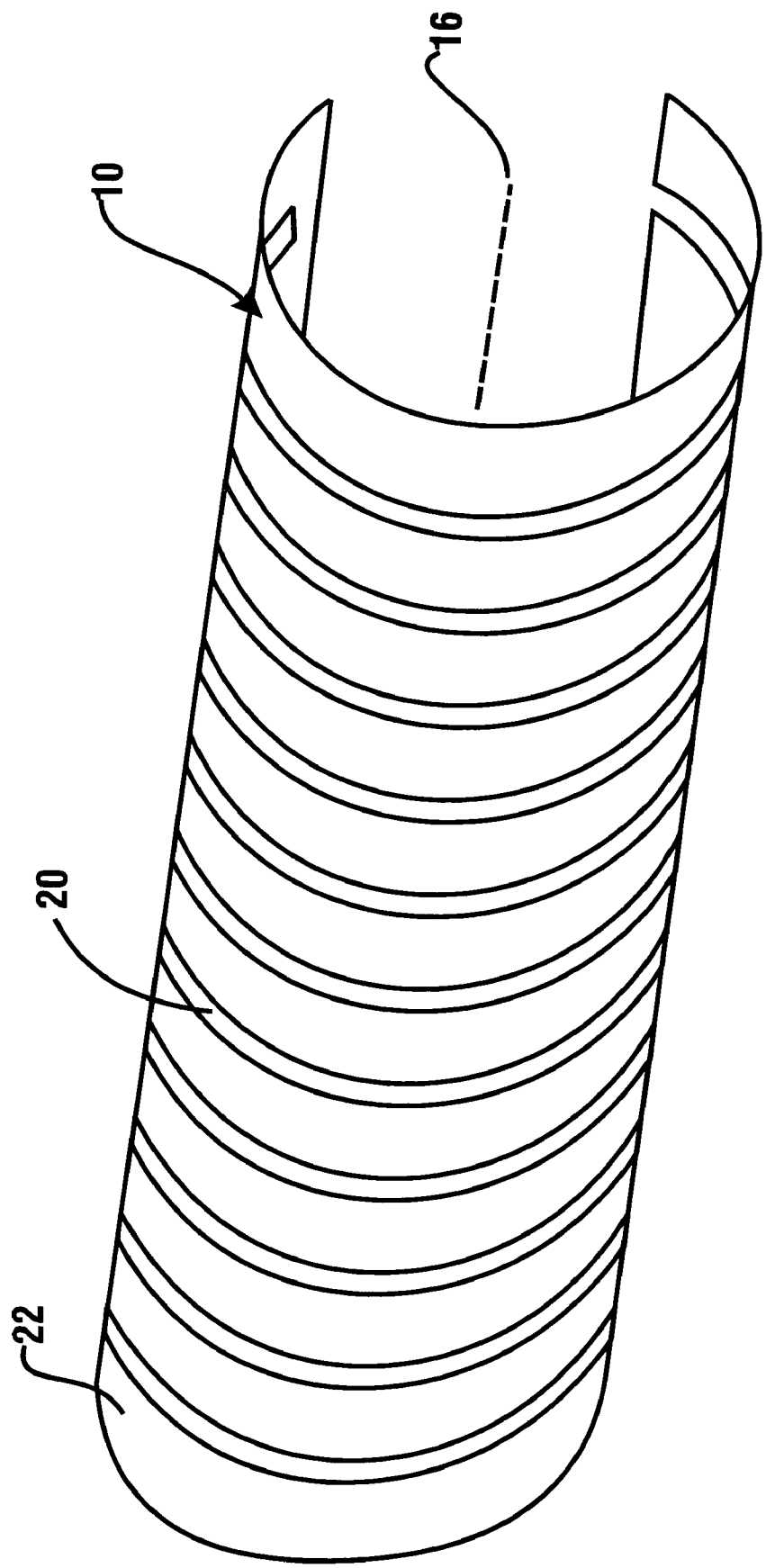
FIG. 6 shows the slotted seal element of FIG. 1 fashioned into a C-shaped, tube-like formation.

As shown in FIG. 6, the exemplary slotted seal element 10 of FIG. 1 is formed or fashioned into a C-shaped or U-shaped, tube-like configuration. The shape may be curved or substantially cylindrical. The sealing element 10 extends about a longitudinal axis 16. The slots extend (or are elongated) in a circumferential direction substantially perpendicular to the seal axis. Alternatively, the slots can be at an angle, such as the angle in FIG. 4, and do not have to be perpendicular to the longitudinal axis 16. An exemplary seal apparatus has at least two layers of sealing elements, with one sealing element being located inside or interior of another sealing element. When a substantially flat or linear sealing element sheet is formed or changed (e.g., by rolling or other suitable process) into a "C" or "U" shape, the sealing element can act as a spring having a spring action or bias in a radial direction relative to the longitudinal axis. The "C" or "U" shaped elements (and the seal) can be compressed and thus biased toward unrolling or opening responsive to radial compression thereof. Thus, an exemplary seal can serve as a spring seal.

Depending on the sealing application, sealing elements may comprise materials including superalloy metals (e.g., Inconel 718, Inconel X-750, Rene 41, Waspalloy), oxide-dispersion strengthened alloys (e.g., MA754, MA956, PM1000, PM2000), NiCrAlY alloys, platinum, oxide-dispersion strengthened platinum, gamma titanium-aluminide, and other oxide-dispersion strengthened materials. For higher temperature applications (e.g., applications over 2000 F), the sealing elements can be fashioned out of refractory materials, such as silicon carbide, silicon nitride, alumina, carbon, columbium, moly-rhenium, magnesium-oxide-chrome alloys, TZM, or tungsten. Composite materials may also be used, such as a silicon carbide reinforced silicon carbide, silicon carbide reinforced silicon nitride, carbon reinforced silicon carbide, or carbon reinforced carbon. For low temperature applications (e.g., applications less than 600 F), polymeric materials may be used for the sealing elements, including nylon, PTFE (e.g., Teflon), polyamides, polyimides, and their associated composite forms (e.g., glass reinforced PTFE).

Figure 7:
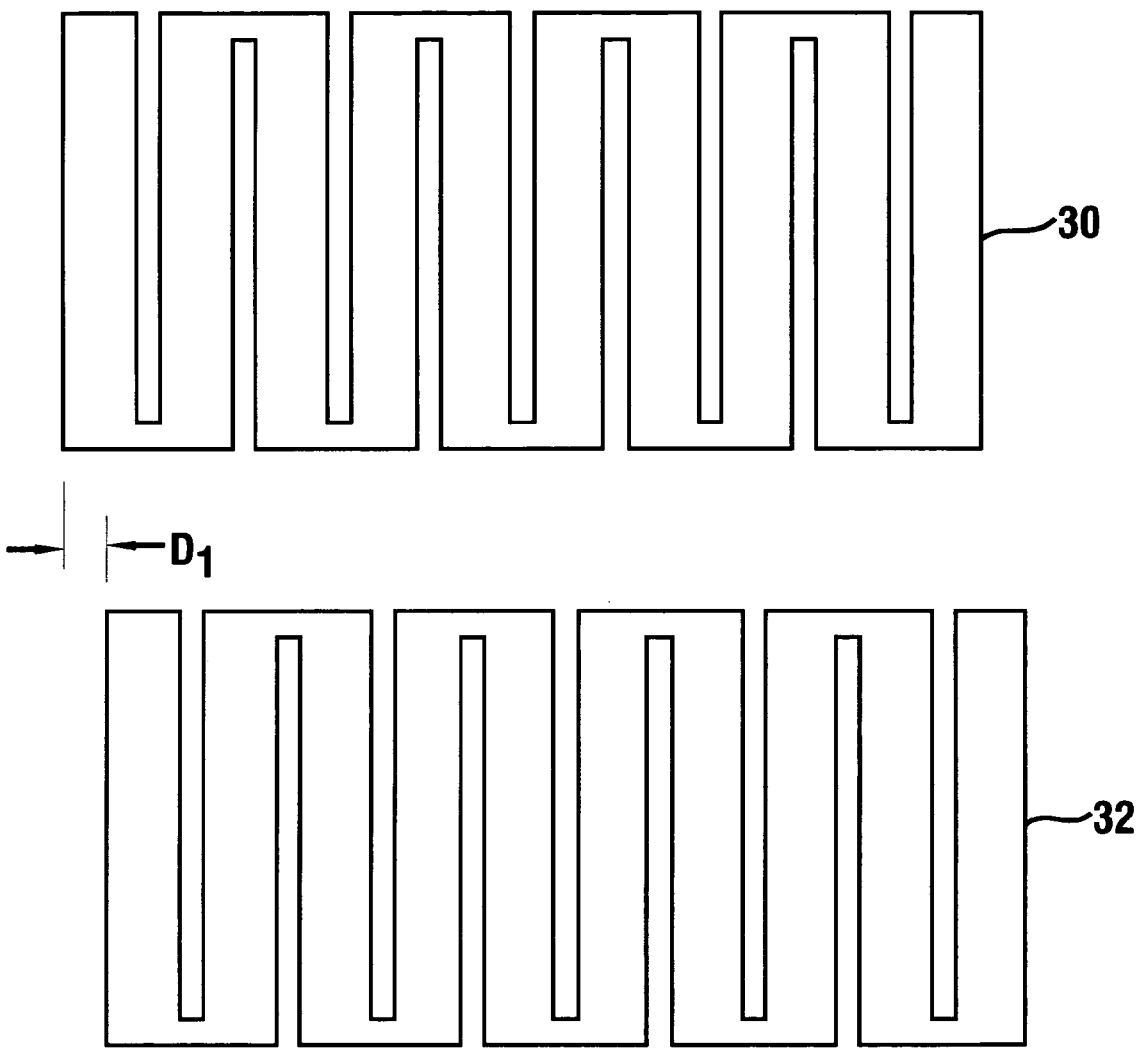
FIG. 7 shows first and second layers of offset sealing elements.
Figure 8:
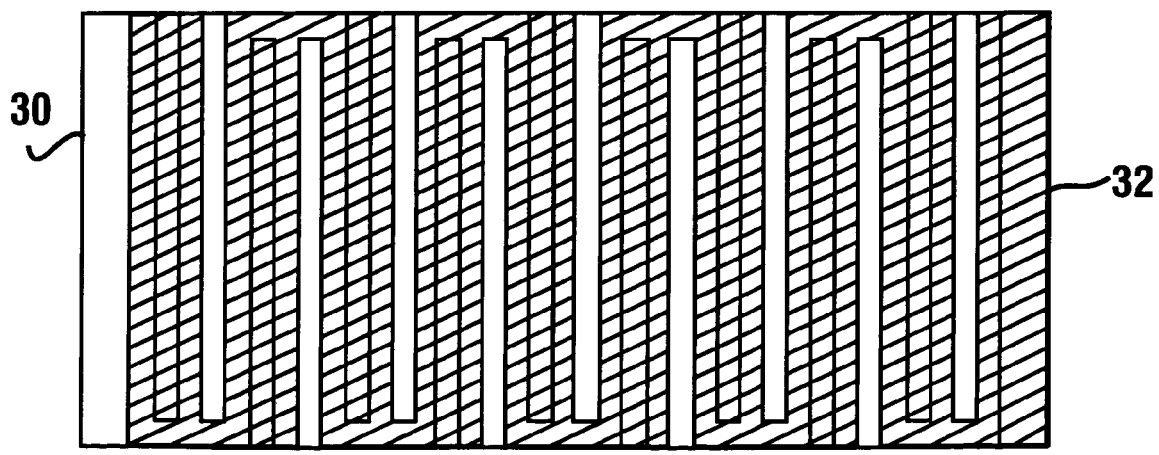
FIG. 8 shows the layers of FIG. 7 positioned adjacent to each other.

FIG. 7 shows a first layer 30 and a second layer 32 comprised of offset sealing elements adjacently arranged. The seal elements 30, 32 are relatively offset in a direction parallel to the length of the seal elements (e.g., in a direction along the longitudinal axis of the seal elements when fashioned in a cylindrical tube-like direction). In FIG. 8 the seal elements of the type shown in FIG. 7 are stacked or layered adjacent to each other to show the overlap. As shown in FIG. 8, the strips of an outer sealing element can cover or overlap the slots in an adjacent inner sealing element, and vice versa. By arranging adjacent sealing elements so that the slots therein are offset relative to slots in adjacent elements, the amount of flow or leakage through the slits or slots in the sealing elements can be minimized or eliminated while seal flexibility is maintained. The stacked relationship of sealing elements, such as those having a C-shape, can enable covering and blocking flow through the slots. FIG. 7 shows offsetting placement of identical sealing elements 30, 32 having the same slot pattern. The offsetting (or shifted) distance of the two sealing elements is represented by $D_1$. When using many sealing elements, every other sealing element can be aligned in offset relationship to an adjacent sealing element.

Alternatively, two or more adjacent sealing elements can each have their respective slots overlapped by another element without the need for offsetting, such as by using dissimilar or non-aligned slot patterns. For example, sealing elements could have their slot patterns shifted or offset so that when the sealing elements are in adjacent stacked alignment the slots are covered, as shown in the arrangement of FIG. 9. That is, instead of offsetting a sealing element (relative to another sealing element) to block flow through slot openings, the slot pattern of a sealing element can be offset relative to a similar adjacent slot pattern. In FIG. 9, the seal element 34 has the same slot pattern as sealing element 30, but a different strip pattern. That is, the ends of the seal elements 30, 34 can be aligned, with one end 36 having a larger strip portion 40 (with more material) than the other end 38.

It should be understood that in exemplary embodiments a plurality of sealing elements (e.g., more than two layers of sealing elements) could be used. Furthermore, when using more than two sealing elements, an intermediate sealing element can have its slots overlapped on each respective side, such as by a first respective element immediately adjacent a first respective side and second respective element immediately adjacent the other respective side.

Figure 10:
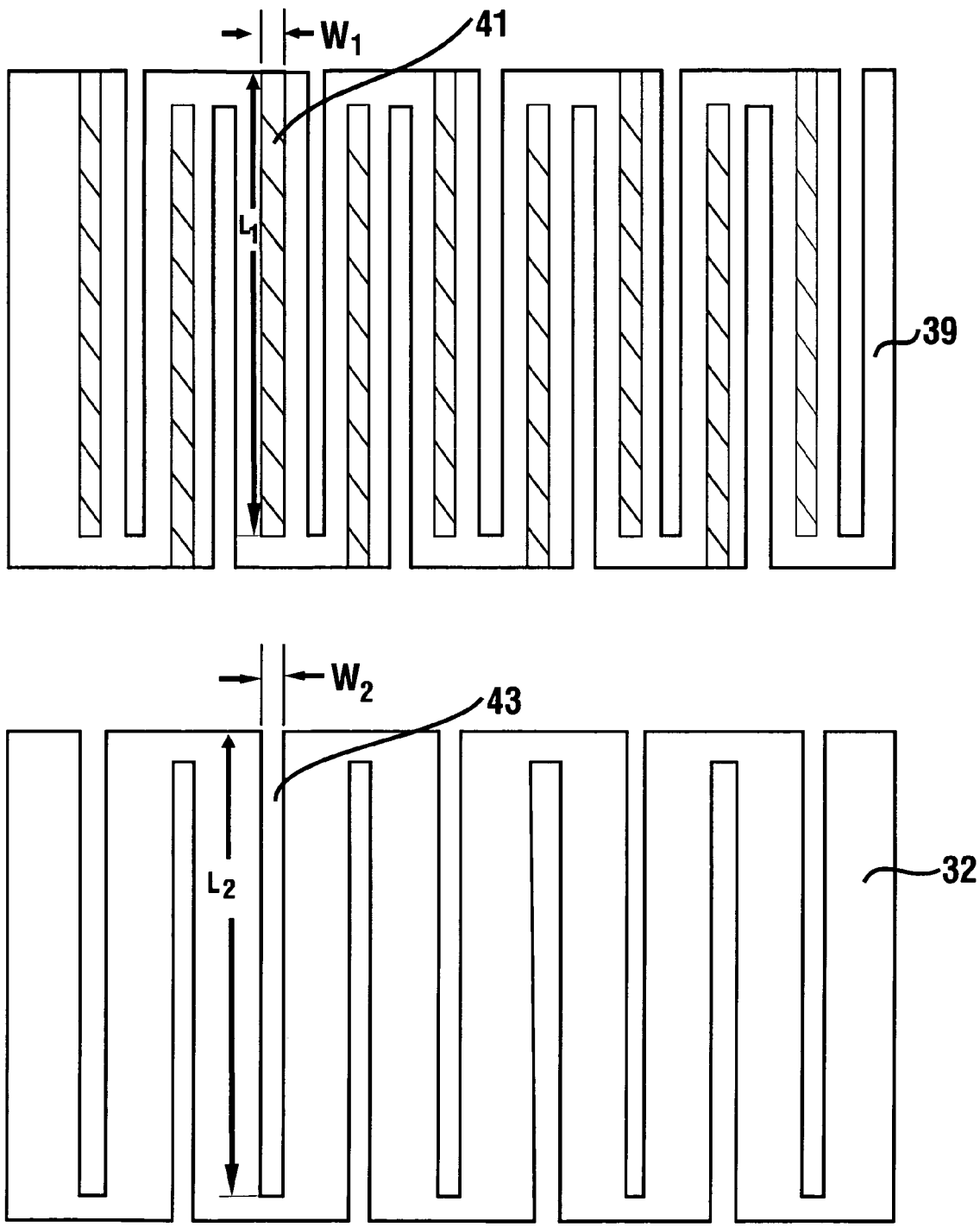
FIG. 10 shows the relationship of barrier strips of a seal element corresponding with slots of an adjacent seal element.

For applications requiring higher sealing effectiveness, barrier strips 41 can be attached to the outer surface of an inner seal element 39 as shown in FIG. 10. The barrier strips 41 can be attached by various means, including bonding, brazing, welding, or other appropriate methods of attachment. The barrier strips 41 are aligned to correspond with the openings or slots 43 of adjacent outer element 32. The barrier strips are of appropriate width $W_1$ and length $L_1$ to block flow through the slots without significantly altering seal flexibility. This can be accomplished by ensuring that the width $W_1$ and length $L_1$ of the barrier strips 41 are respectively shorter than the width $W_2$ and length $L_2$ of the slots 43 in the outer sealing element 32.

Figure 11:
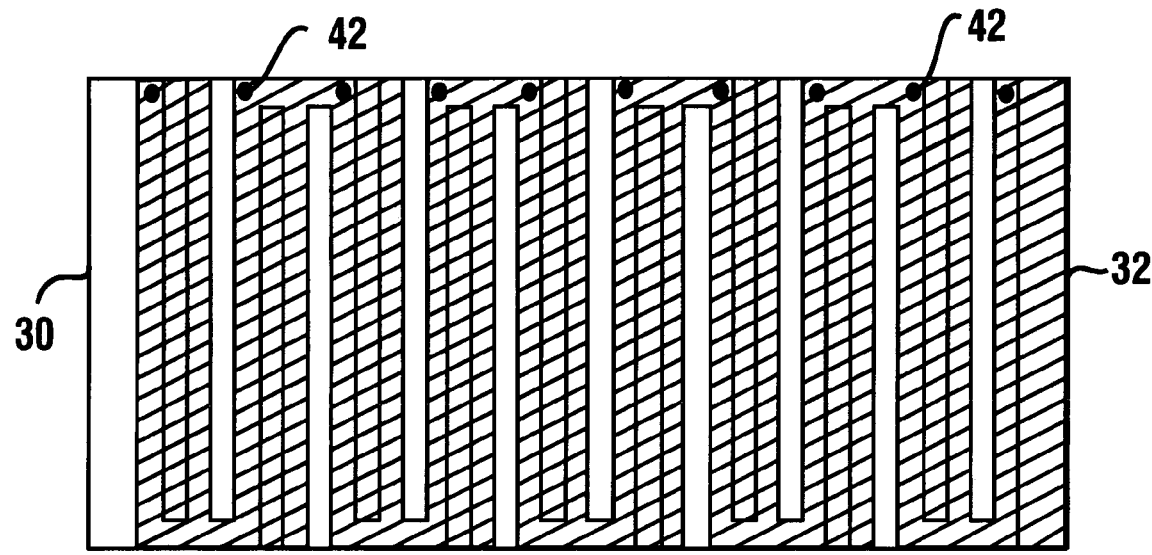
FIG. 11 shows a sealing element attachment scheme.
Figure 12:
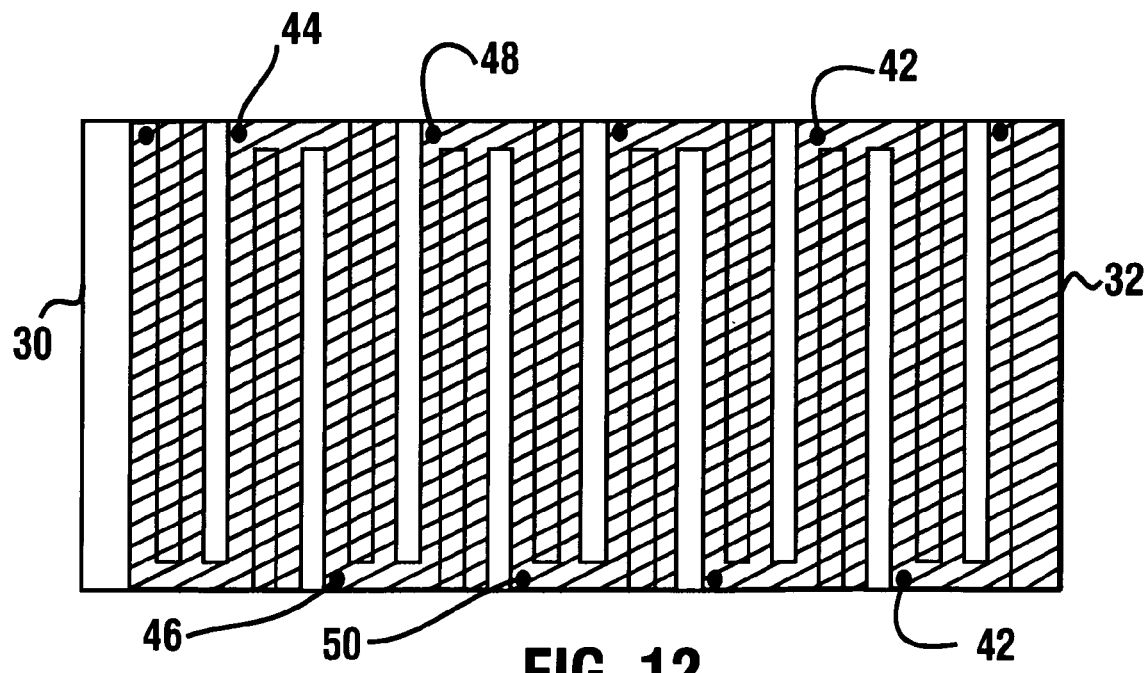
FIG. 12 shows another sealing element attachment scheme.

To keep sealing elements oriented properly with respect to each other, such as in an overlapping offset relationship, the elements may be attached together periodically or at selective attachment points. Multiple sealing elements can be attached to one another using mechanical structures (e.g., tabs, tangs, etc.), or by brazing or welding at selected locations, or by other known attaching or affixing arrangements (including arrangements capable of withstanding the anticipated operating temperatures). The attachment pattern connecting two adjacent sealing elements can be varied to provide different degrees of seal flexibility. For example, FIG. 11 shows an attachment pattern (or scheme) different from the attachment pattern shown in FIG. 12. The attachment points 42 are each represented by a small darkened area. The length, width, and spacing of slots can also be adjusted or modified to provide a seal with different degrees of flexibility and flow-blocking capability. For example, wide, closely spaced slots can make a seal more flexible, whereas narrow, distantly spaced slots can result in a more rigid seal. In FIG. 11 the attachment scheme has the attachment points on a single side (e.g., uniform attachment pattern). In FIG. 12 the attachment scheme has attachment points on alternating sides (e.g., alternating attachment pattern). The seal element 32 of FIG. 12 has along its length or longitudinal axis a first attachment 44 located adjacent a first side, a second attachment 46 located adjacent an opposed second side, a third attachment 48 located on the first side, and a fourth attachment 50 located on the second side. That is, the attachment pattern of FIG. 12 includes at least one sequence in which attachment points alternate on opposite sides along the seal element axis. In some embodiments seal flexibility will be facilitated by enabling some degree of relative movement of adjacent seal elements while maintaining a blocking relationship for seal element slots. The nature of the method used for attaching the seal elements together is preferably consistent with achieving the desired degree of seal flexibility.

Figure 13:
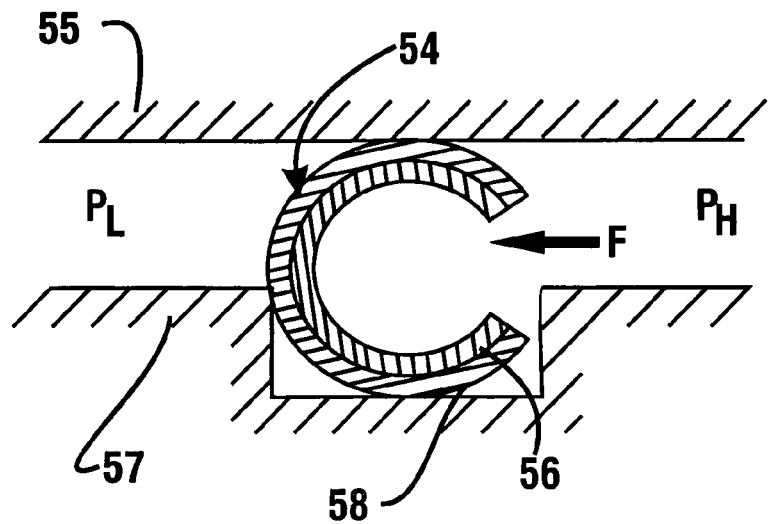
FIG. 13 shows a cross section of a seal comprising a double layer of sealing elements.
Figure 14:
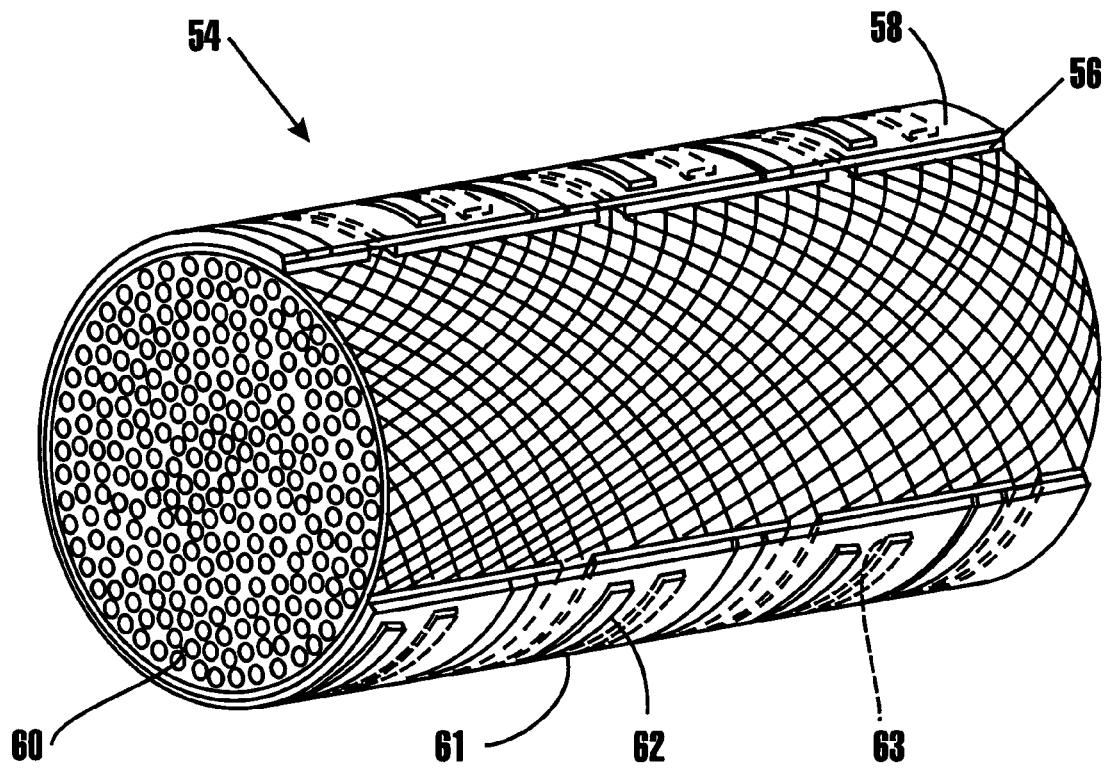
FIG. 14 shows the seal of FIG. 13 with barrier strips and a central load-bearing core structure.

FIGS. 13 and 14 show a seal 54 comprising a double layer of sealing elements including an inner sealing element 56 and an outer sealing element 58. FIG. 13 shows a cross-section of a portion of the seal 54. FIG. 14 shows barrier strips 61 attached to the inner element 56 in locations corresponding to slots 62 in the outer sealing element 58. These barrier strips minimize flow F through the slots 62 in the outer sealing element 58 when the seal is engaged with adjacent structural surfaces 55, 57. In this manner the seal 54 is effective at blocking leakage flow from an area of high pressure $P_H$ to an area of low pressure $P_L$. FIG. 14 also shows the outline of slots 63 in the inner element 56.

A seal apparatus can also include a support or load-bearing core structure. The load-bearing core structure can be located in the inner core volume of a seal inside an area bounded by an innermost sealing element. FIG. 14 shows the seal 54 comprising a centrally located load bearing core structure 60. The core structure 60 can comprise a braided rope seal, rolled length of textile material or fabric, braided sleeve, knitted sleeve, metal spring tube, canted coil spring, or any combination of these and/or other items. For example, the core structure 60 may comprise a braided ceramic rope. Also, both a braided sleeve and a metal spring tube may be filled with material, such as fibrous insulation. A core structure can provide support to the thin sealing elements and assist in bearing service loads. A central core structure can also provide extra resiliency, flow resistance, and thermal resistance to the seal. For example, a core structure having high temperature ceramic materials may serve to insulate the primary sealing elements from high temperature gases that may impinge on the high pressure side of the seal. A seal may comprise more than one core structure, including overlapping core structures and/or axially positioned core structures. The core structure 60 of FIG. 14, which extends within and is mostly surrounded by the innermost sealing element 56, provides additional load bearing, resiliency, and thermal insulation properties to the seal.

If a braided rope seal or rolled textile fabric is used as the core 60 of a seal, then materials thereof may include for example ceramic fibers (e.g., alumina-silica, alumina, silicon carbide, silicon nitride, hafnium carbide, or Sylramic), superalloy wires, or carbon fibers. Materials that can be used for a spring tube in a core can include wires made of superalloy metals (e.g., Inconel 718, Inconel X-750, Rene 41, Waspalloy), oxide-dispersion strengthened alloys (e.g., PM1000, PM2000), NiCrAlY alloys, platinum, oxide-dispersion strengthened platinum, gamma titanium-aluminide, and other oxide-dispersion strengthened materials. Alumina-based fibrous insulation can be used to fill the spring tube. Of course other materials and structures may be used.

The exemplary seal includes features that allow it to be both resilient and flexible. The seal uses the pressure differential acting thereon to relatively move and sealingly fill the gap between adjacent structural components. In an exemplary operation of a C-shaped seal of the invention, the seal is arranged so that the opening in the C-shaped cross section of the sealing elements is located adjacent the high pressure side of the seal. A closed portion of the C-shape is located adjacent the low pressure side of the seal. Thus, the seal opening (and the interior of the seal) is accessible to the high pressure area, whereas the closed portion of the seal bounds the low pressure area.

Figure 15:
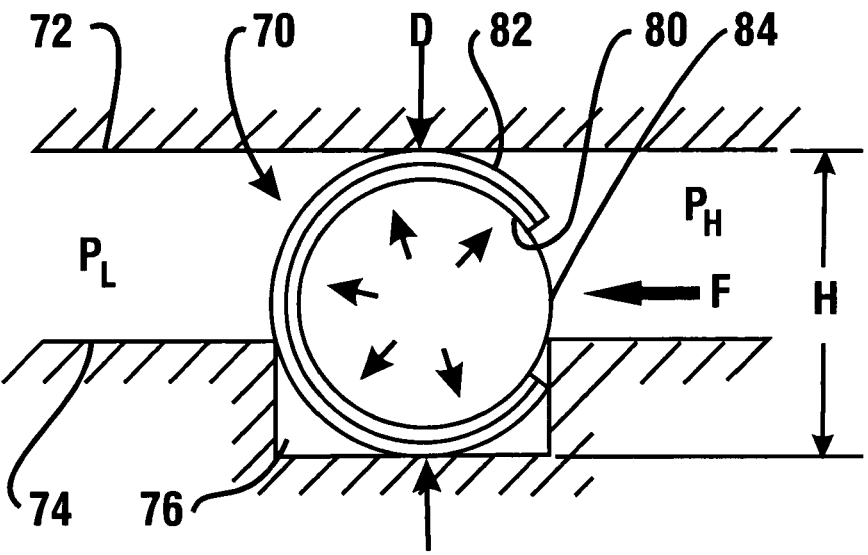
FIG. 15 shows a C-shaped pressure-activated seal positioned between high and low pressure areas and providing sealing between adjacent structural components.

FIG. 15 shows an exemplary arrangement of a C-shaped seal 70 positioned between adjacent structural components 72, 74 and between relatively high ($P_H$) and low ($P_L$) fluid pressure areas. The arrow F represents the direction of fluid flow from $P_H$ toward $P_L$. The seal 70 is shown installed in a seal groove 76 of the structural component 74. The longitudinal axis of the seal 70 is substantially perpendicular to the direction of arrow F. The longitudinal axis of the seal 70 is substantially parallel to the contacting structure surfaces (i.e., sealing interfaces).

In a sealing arrangement a seal (or outermost diameter of the outermost sealing element) may be initially placed in sealing engagement contact with adjacent surfaces (e.g., structural components 72, 74) without reliance on pressure-activation to achieve the sealing engagement contact. Alternatively, a seal can be initially placed in minimal contact with adjacent surfaces and rely on pressure-activation to achieve sealing engagement contact. Furthermore, the force generated by a low pressure differential across a seal may not be strong enough to initiate or activate sealing element movement or contribute to increasing sealing force against the walls of the adjacent structures. However, upon the pressure differential reaching a higher level (i.e., a seal-activating level) the pressure force generated is operative to cause an increase in engaging force between the seal and the adjoining structures resulting in sustained external sealing contact with the adjoining structures.

In FIG. 15 the seal diameter D can be generally made to be equal or greater than distance H. In cases where D is greater than H, the seal 70 is in initial external sealing engagement with the adjacent structural components 72, 74. High pressure acts on the volume inside of the stacked thin sealing elements 80, 82 and biases them against each other and toward the walls of the adjoining structures 72, 74, and the walls of the seal groove 76. Even with initial placement of a seal in external sealing engagement contact with adjoining structures, a high enough pressure in the interior volume of the seal can still act to contribute (via a pressure force) toward external sealing of the seal with the adjoining structures. The high pressure can act even with a load-bearing core structure (e.g., structure 84) located in the seal. Thus, a seal can provide pressure-activated external sealing ability.

Pressure-activation can also produce internal sealing of the seal elements and their respective slots. In FIG. 15 the radially outward arrows in the seal represent a pressure activation force that acts upon the sealing elements 80, 82. The seal is responsive to a sealing activation pressure differential across the seal to cause the seal elements to be biased in a radially outward direction in the area of the adjacent structural components. The inner sealing element 80 is operative to move into biasing engagement with the outer sealing element 82 to remove any gap therebetween and to provide increased slot sealing responsive to a pressure differential force across the seal attaining a seal-activating level. That is, the pressure-induced relative movement of the sealing elements toward each other causes the slots to be covered or sealed because the radial space or gap between adjacent sealing elements becomes minimized. A low pressure differential across the seal may not be strong enough to initiate or activate slot sealing. However, upon the pressure differential reaching a higher level (i.e., a seal-activating level) the pressure force generated is operative to cause an increase in engagement between the sealing elements resulting in sustained sealing of the slots. The pressure force can press against or overcome the biasing of a C-shaped sealing element to cause effective pressure-induced or pressure-activated sealing. Thus, pressure-activation can produce both internal and external sealing of a seal.

The covering of slots in the radially overlapping seal elements can reduce the amount of flow that passes through the slots and serves to increase the sealing effectiveness responsive to pressure activation. Additionally, higher working pressures can produce higher seal seating loads and further increase seal effectiveness. Thus, sealing ability or efficiency of the seal can be directly correlated to (or a factor of) the force of the pressure differential across the seal. Thus, the sealing force can be pressure dependent.

The use of overlapped or stacked sealing elements can form an exemplary seal that blocks substantially more flow than can be achieved with conventional thermal barriers used in current space vehicles. The pressure activation principles of the exemplary seal also result in increased seal resiliency over conventional braided rope seal technology. The increased resiliency allows a seal to accommodate larger deflections and seal variable gaps caused by relative movement and dimensional changes of adjacent structures due to temperature changes. Furthermore, the increased resiliency of the exemplary seal may serve to minimize seal permanent set and hysteresis that may occur with conventional thermal barrier designs.

In an exemplary seal, the sealing elements have relatively smooth surfaces (e.g., less than 32 in.). Thus, contact at the sealing interface between the outermost sealing element's smooth outer surface and the structural component walls can effectively block most of the flow through the gap between the adjacent structural components. However, some leakage may flow through small gaps that may exist along the contact area between the seal and the adjacent structure due to the presence of slots in the outermost sealing element. Such fluid flow leakage may pass through that portion of a slot which is immediately adjacent the contact area with the adjacent structural element. That is, leakage flow may pass through small gaps at the sealing boundary of the structural wall, the two axially-spaced circumferential edges of the outermost sealing element which bound the slot, and the outer surface of an adjacent inner sealing element. The leakage gaps would have an outer surface represented by the wall, an inner surface represented by the inner sealing element, and side surfaces represented by the slot edges. The flow area of each leakage gap would be equal to the thickness of the outer sealing element multiplied by the width of the slot. In the exemplary seal the sealing forces and resulting deformation of the sealing elements tend to reduce the area of the gaps such that leakage across the seal is less than the leakage that would be enabled to flow past the contact area of a braided rope seal.

Figure 16:
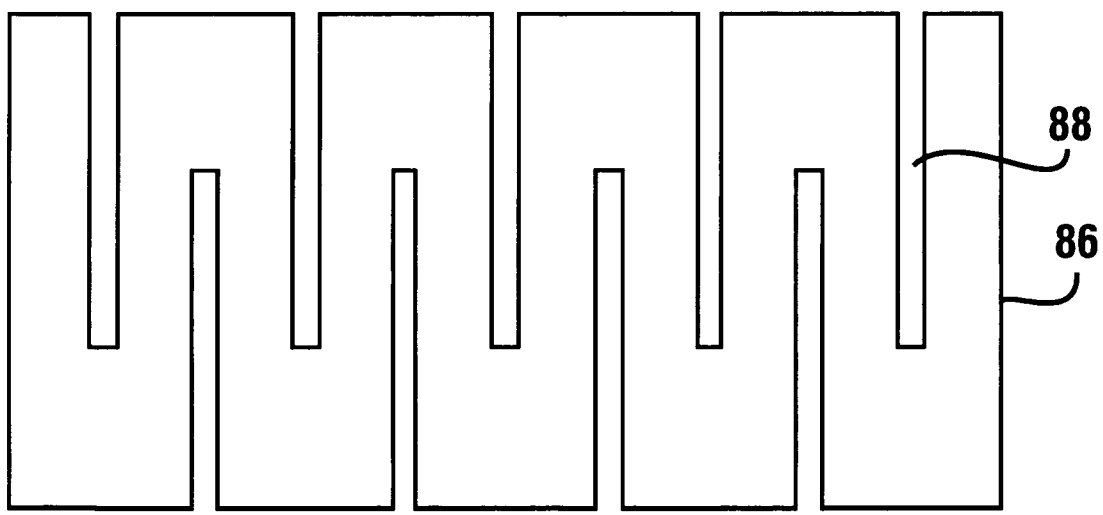
FIG. 16 shows a sealing element with an alternative slot length.

To reduce leakage in the area of the interface between the seal and the adjacent structural elements some exemplary embodiments may be designed so that slot areas in the outer element may be reduced. For applications which require low leakage, the length of the slots in the outer sealing element can be reduced to eliminate a portion or percentage (for example, half) of the leakage paths in the contact area between the seal and the adjacent structure. FIG. 16 illustrates an embodiment having reduction in slot length as compared to the previously described configuration, such as shown in FIG. 1. The S-shaped outer seal element 86 in FIG. 16 has slots 88 in a configuration that can be used for reduced leakage sealing applications. In some exemplary embodiments, the slot length can be varied to achieve desired properties of reduced interface leakage and seal flexibility suited to the particular application.

Figure 17:
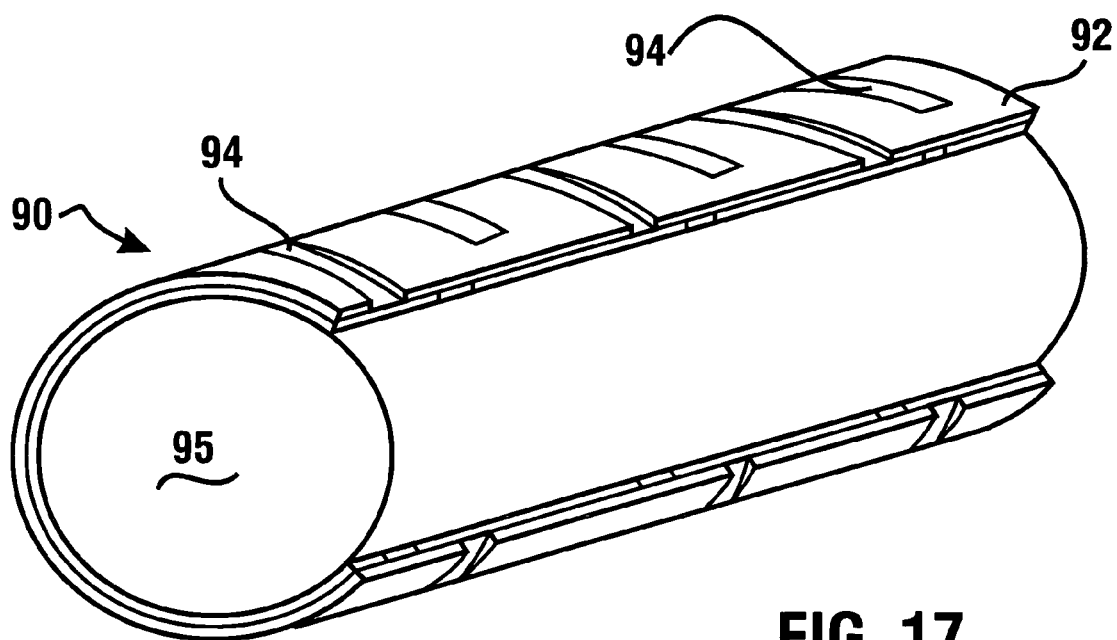
FIG. 17 shows a sealing element having a leakage path arrangement.
Figure 18:
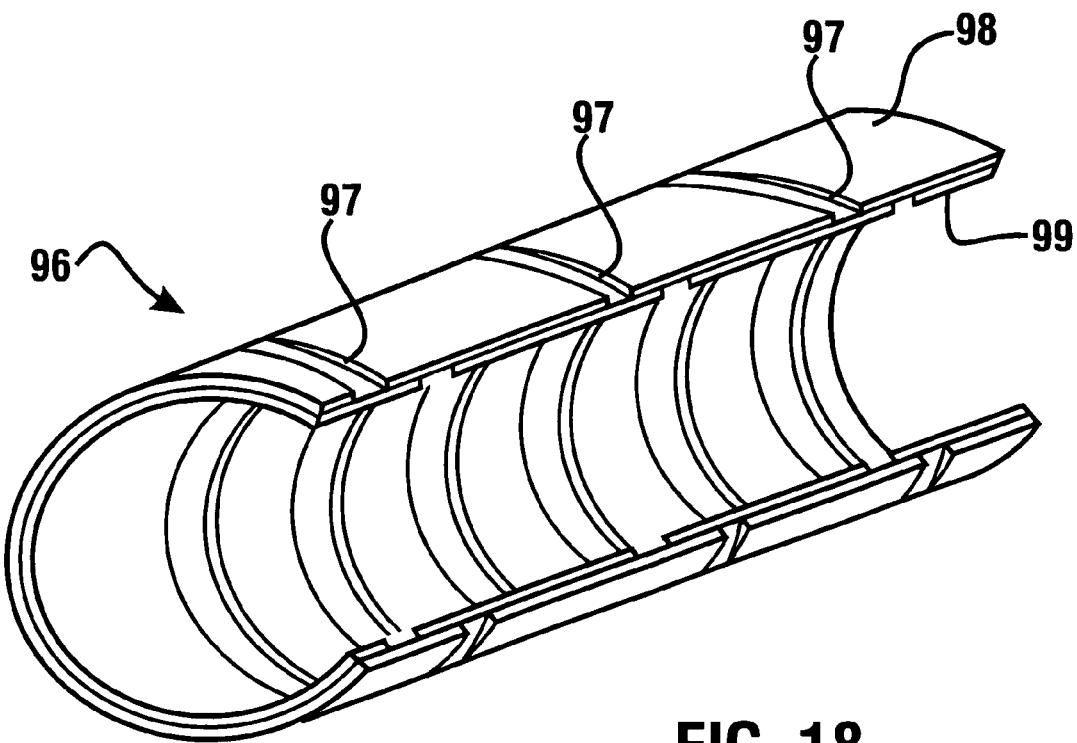
FIG. 18 shows a sealing element having an alternative leakage path arrangement.

FIG. 17 shows another alternative seal element configuration. In FIG. 17 the seal 90 comprises an outermost sealing element 92 having six slots 94 for the length shown. A load-bearing core structure 95 is also shown. In comparison, FIG. 18 shows a seal 96 comprising a reduced leakage configuration due to having only three slots 97 (e.g., slot leakage paths) in the outermost sealing element 98 in the seal contact zone for the same seal length. An inner sealing element 99 is also shown. With less slot area in the outermost sealing element 98 in comparison to the outermost sealing element 92, the seal element 98 will have lower leakage but may be more rigid and less subject to deformation. Thus, the seal 96 may be used without a load-bearing core structure in some applications where a core structure might otherwise be necessary to maintain seal structure integrity due to applied loads.

Leakage through the slots or similar features of the outermost sealing element of exemplary embodiments may also be reduced by reducing the flow area through these slots. As previously discussed, the flow area for each slot would be approximately equal to the thickness of the slot multiplied by the width of the slot. The flow area may be reduced by having the outermost seal element be made relatively thinner than the inner elements. A relatively thicker inner sealing element can be positioned inboard of the outer sealing element to provide structural integrity and load-bearing capability to the seal. For example, an inner sealing element may be made relatively thicker to compensate for the loss in strength and rigidity resulting from use of a relatively thinner outer sealing element. Alternatively, or in combination therewith, the width of the slots or other features in the outermost sealing element may be reduced to minimize leakage therethrough.

In some very high temperature sealing applications it may be desirable to cool the seal. One way to accomplish this is to positively pressurize the seal with a coolant gas pressurized at higher pressure, $P_H$ (e.g., FIG. 15), than operating pressures, $P_L$ (e.g., FIG. 15) to leak past a seal (e.g., seal 70) and the adjacent structures (e.g., structures 72, 74). Slots (e.g., slots 62 in FIG. 14; slots 94 in FIG. 17; and slots 97 in FIG. 18) can be used to allow small and controllable amounts of cooling flow through the seal. The rate of leakage may be predetermined.

In exemplary embodiments, different materials may be selected for the inner and outer sealing elements to enhance sealing qualities or abilities. For example, materials can be selected with different coefficients of thermal expansion (CTE) for each sealing element to permit thermal activation of the seal. Use of a material with a high CTE for an inner member (e.g., an inner sealing element) will, upon heating, cause the seal to increase in diameter, thereby causing increased sealing forces against adjacent surfaces. Thus, an exemplary seal can comprise a pressure-activated and thermal-activated seal.

Furthermore, an exemplary seal can comprise an outermost sealing element fabricated from materials having low wear and friction qualities to minimize wear while sealing and sliding against adjacent surfaces. The material can be used to promote slidability and/or reduce wear between the outermost sealing element and the adjacent structure. For example, at low temperatures a Turcite material may be used. Furthermore, an exemplary seal can also comprise one or more inner sealing elements fabricated from materials having relatively higher strength (e.g., relative to an outermost sealing element) to provide the highest structural integrity to the seal.

In an exemplary seal embodiment, the seal has a sheath composed of multiple C-shaped or U-shaped sheet element layers around a resilient core structure. The seal comprises strips of sheet material (e.g., metal) into which slots or other similar features extend on the same or alternating sides of a strip. The strips are then curved or formed into C-shaped layers having a tube-like cross section. The pattern of slots in the element layers enhances flexibility. The exemplary sheet element layers are staggered so that material in the outer element layer covers the slots in the inner element layer and vice versa. The staggered slots are covered to block hot gases from passing through the seal. To further minimize leakage, barrier strips can be attached to the inner sealing element corresponding to the slots in the outer sealing element to block interfacial flow between the outer element layer and adjacent structures.

The exemplary C-shaped or U-shaped seal is able to be formed to seal around corners and curved structures of adjacent structural elements. Some prior art C-shaped seal structures employ a continuous rolled metal sheet that produces a stiffness that is best suited for linear sealing applications. These prior art C-shaped seals are formed to a specific shape using special purpose forming dies before installation. However, an exemplary seal of the invention, by using two or more overlapping sealing elements with a cut pattern of slots or similar acting structures in the elements which comprise the seal, may enable the seal to have more flexibility. This may eliminate the need for prior special purpose forming of the seal, as is required with the conventional metal C-shaped seals. Thus, the exemplary forms of the seals described herein are able to flex and to be manually positioned to extend around corners and curved structures without the need for prior forming of the seal to a conforming configuration. As previously discussed, the increased flexibility (both longitudinal and transverse) of the exemplary seal can be achieved through use of a slot pattern or similar structures in sealing elements and the overlapping sealing element layers.

A central core structure can provide seals of exemplary embodiments with resiliency and load-bearing capability beyond what the sealing elements alone can provide. For example, at low pressures the sealing elements may not be sufficiently "inflated" or biasingly engaged with adjacent structures by the small pressure differential across the seal. Until pressure activation fully occurs, the core can serve to support the sealing elements and help to keep them in biased engagement against the adjacent structures. A core structure may be situated so that it substantially fills the interior of an innermost sealing element.

Figure 19:
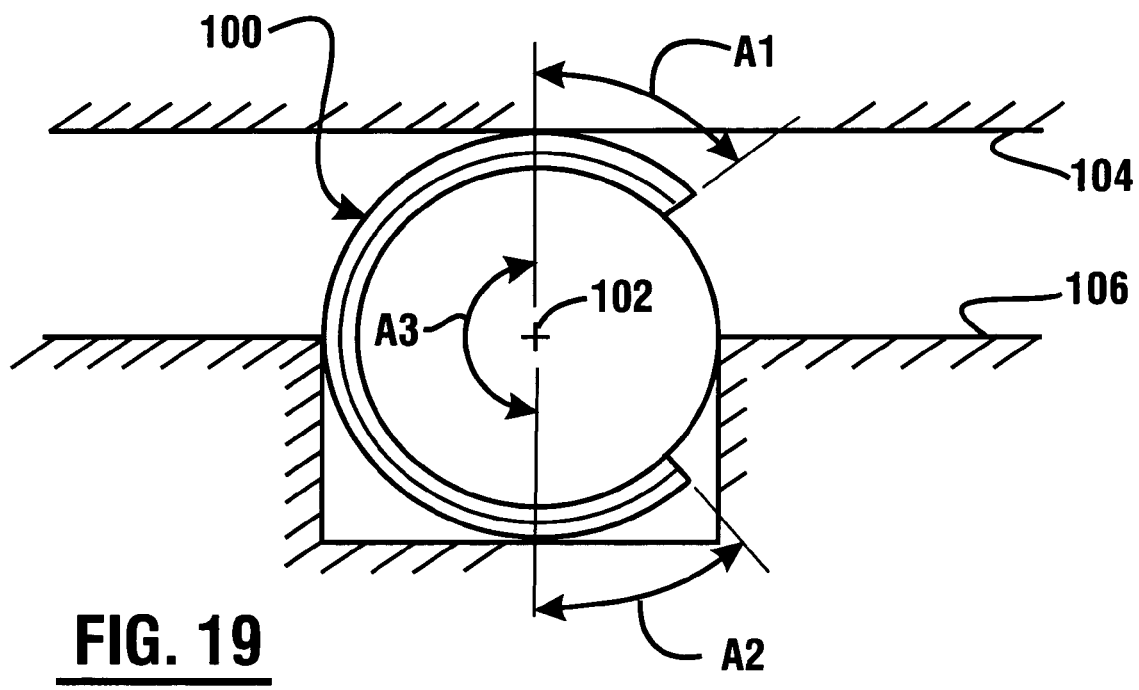
FIG. 19 shows a C-shaped seal having a coverage arc greater than 180 degrees.

To reduce orientation sensitivity of a seal, the sealing elements of some exemplary embodiments may be sized and configured so that the "C" shape covers a circumference of substantially greater than 180 in the seal cross section. Such an arrangement is shown in FIG. 19, where the exemplary seal 100 has elements with an arc that extends beyond 180. This additional coverage is represented by the arcs $A_1$ and $A_2$. The arc $A_3$ represents a 180 angle about the longitudinal axis 102. FIG. 19 further shows the seal apparatus having the seal 100 arranged in sealing position with spaced structural elements 104, 106.

If the C-shaped elements of the seal only covered an arc of 180, then the seal could rotate due to relative movement of adjacent elements and lose sealing contact with the adjacent wall surfaces. This loss of sealing contact could limit pressure activation of the seal and also allow an undesirable level of flow through and around the seal. By increasing the arc coverage of the sealing elements, the orientation sensitivity of the seal is reduced and pressure activation is more likely to be consistent and predicable. Thus, by extending the circumferential arc surface of at least the outermost sealing element (e.g., decreasing the opening in the seal circumference) the potential for achieving a suitable sealing contact interface is increased. Furthermore, forming or configuring the sealing elements to cover more of the circumference of the seal cross section (e.g., with use of an overly-closed C) also helps to maintain a core structure (if used) inside the volume bounded by the sealing elements and to maintain the structural integrity of the seal. The formation of the exemplary seal in FIG. 19 is such that the sealing elements cover substantially more than 180 of the seal circumference to prevent reduced sealing effectiveness, seal roll, and loss of sealing contact.

Figure 20:
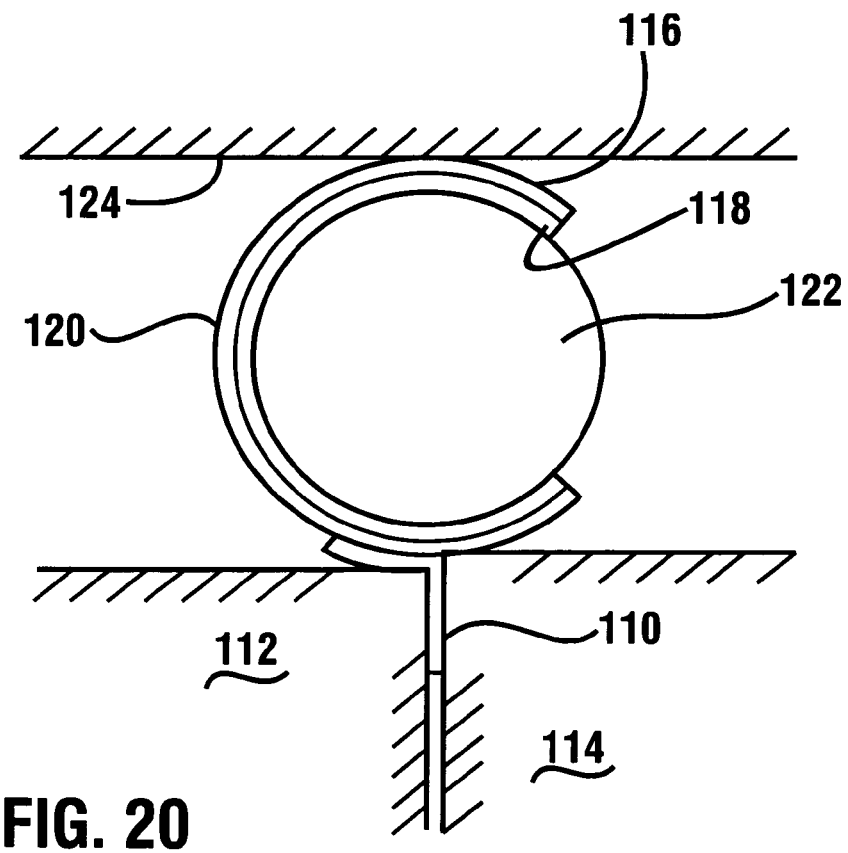
FIG. 20 shows a tab fastened to a sealing element and adjacent anchoring structure.

Other arrangements may be used in some embodiments to prevent a seal from rolling in a gap between adjacent structural elements. For example, one or more tabs (or fingers, lips or suitable projections) may be secured to the outer sealing element of a seal. The one or more tabs can be used to anchor the seal to one or more adjacent structures. For example, a seal tab can be anchored between two or more adjacent structures. The tabs can be attached to the outer sealing element to act as attachment points for the seal. The tabs can extend or project from the sealing element. FIG. 20 shows an exemplary seal apparatus having a securing or anchor tab 110 secured between anchoring structures 112, 114 and also fastened to an outermost seal layer 116. FIG. 20 also shows the seal 120 having at least two sealing element layers 116, 118 and a core component 122. The attachment tab 110 is shown secured between the two structures 112, 114 which are opposed to another structural wall 124. However, it should be understood that in other exemplary seal apparatus arrangements an anchor tab or other attachment member can be secured to only a single structure.

The anchoring tabs or tangs can be attached or connected to the outer sealing element by riveting, brazing, or welding them to the outer sealing element, or by other known attaching or affixing arrangements. The anchoring tabs and the sealing elements may be made of the same or different material. The use of the same material may make it easier to braze a tab to a sealing element, and may also reduce or eliminate problems that could arise due to the use of different materials, such as differences in coefficients of thermal expansion. A securing tab or other structure may also be integral with the outer sealing element. For example, the material from a cut slot portion, instead of being removed, may remain attached at one end to the outer sealing element and bent outwards to create an anchor tab. An attachment or anchor tab could also be formed by wrapping a layer of woven ceramic fibers or metallic wire around the outside of a sealing element and forming a tadpole-type tail to use as an attachment member. Of course these structures and arrangements are exemplary and in other embodiments other approaches may be used.

Figure 21:
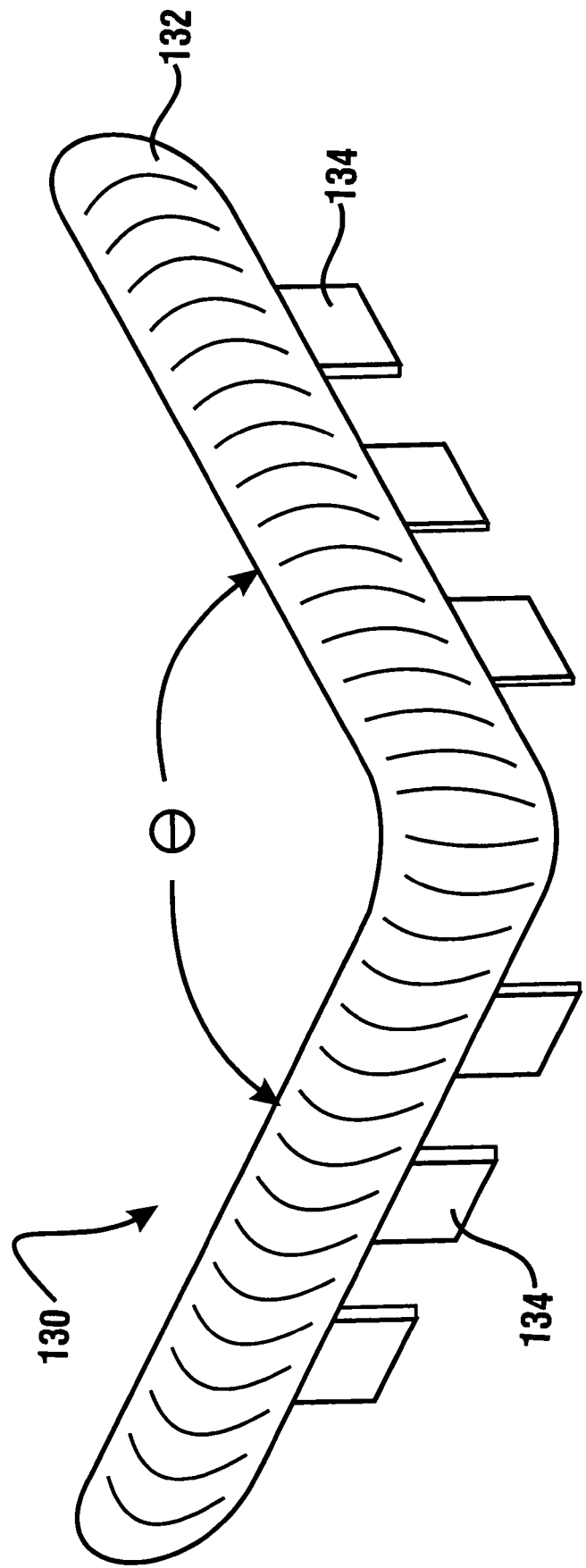
FIG. 21 shows a flexible seal bent around a corner.

The adjacent structures 112, 114 of FIG. 20 that have the intermediate seal may be high temperature ceramic tiles such as those designed to resist the heat of reentry in a space vehicle control surface application. Anchor tabs can be selectively attached at different locations on an outer sealing element to allow the seal to remain flexible. That is, seal tabs can be arranged to prevent them from reducing the flexibility of a seal. For example, in an exemplary seal having a tab arrangement, the seal is allowed to be flexed sufficiently to extend around corners, such as shown in FIG. 21. In FIG. 21 the seal 130 includes sealing elements 132 and plural anchoring tabs 134. The seal 130 is shown flexed about a corner bend angle θ.

Figure 22:
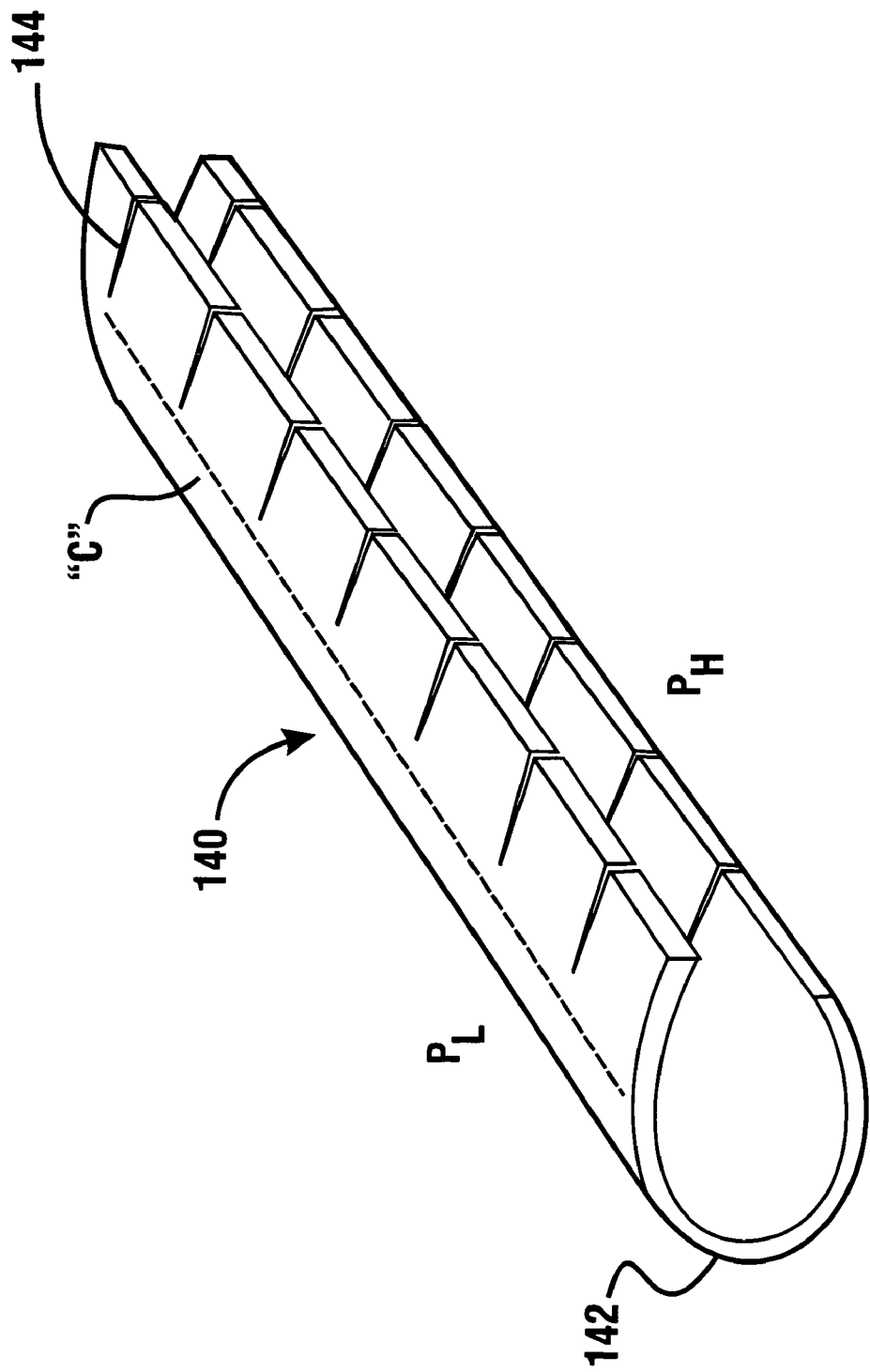
FIG. 22 shows a seal with relatively low flexibility and relatively large flow-blocking ability.

In other sealing arrangements a seal can comprise only a single sealing element or laminate. For example, a sealing application may require a seal with somewhat less flexibility but greater flow-blocking ability (relative to some seal arrangements previously discussed). FIG. 22 shows such a seal 140. The single sealing element 142 includes narrow slots 144. The sealing element 142 is fashioned into a "C" or "U" shaped tubular configuration. The flexibility of the seal can be adjusted based on the spacing of the slots. For example, the slots 144 can be widely spaced from each other for applications requiring limited flexibility. Contrarily, for applications needing greater flexibility, the slots 144 can be spaced closer to each other. The slots 144 can be formed so that they do not extend to the sealing element's region of sealing contact. An example of a sealing contact region for the seal 140 is depicted by the dashed line "C".

The seal 140 is oriented so that the opening in the "C" or "U" configured sealing element 142 is open to the higher pressure $P_H$. In this orientation, the pressure $P_H$ urges the seal 140 into sealing engagement with adjacent sealing surfaces. Thus, the gap between adjacent surfaces can be sealed. Examples of adjacent sealing surfaces (e.g., 55, 57 or 72, 74) have previously been discussed. Of course it should be understood that the seal 140 can be used to provide sealing with regard to other structural arrangements.

Figure 23:
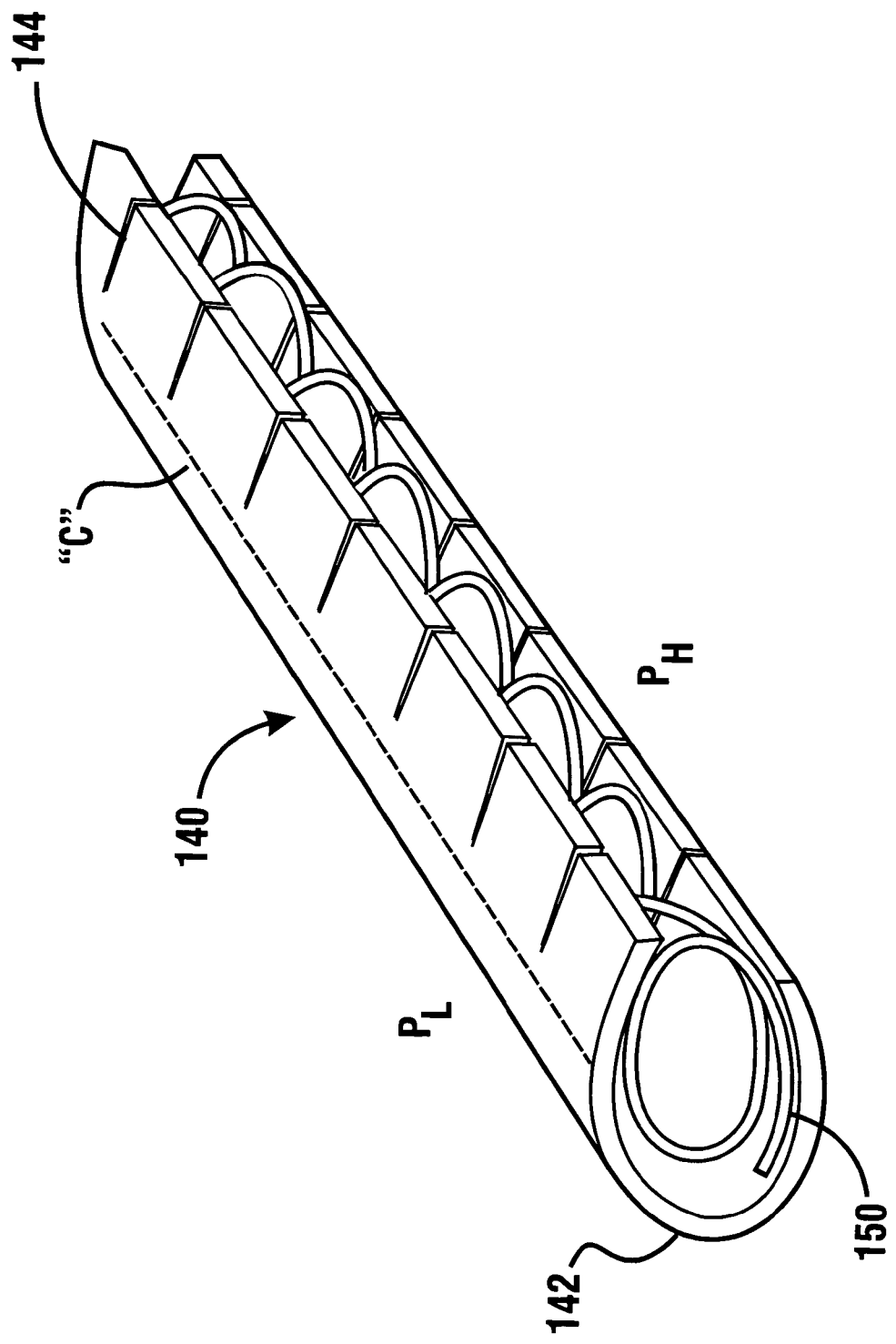
FIG. 23 shows the seal of FIG. 22 with an energizer inserted within the seal element.

The seal 140 can be used to seal large gaps between adjacent surfaces. For example, the seal 140 has the ability to seal gaps which are greater than what is possible alone from the elastic properties of the sealing element 142. As shown in FIG. 23, a spring element or energizer 150 can be inserted inside of the seal element 142. Energizers may include canted coil springs, wave springs, and other shapes and configurations. For example, a canted coil spring may be used as an energizer in sealing applications where the seal gap opens and closes significantly. An energizer can be made of material with suitable yield and creep strength for the intended operating temperature. Depending on sealing operating temperatures, energizers may be made out of superalloy metals (e.g., Inconel 718, Inconel X-750, Waspalloy, Rene 41) and/or oxide-dispersion-strengthened alloys (e.g., MA754, MA956, PM1000, PM2000). For higher temperature sealing applications, the energizer can be fashioned out of refractory material such as platinum, oxide-dispersion-strengthened platinum, silicon carbide, silicon nitride, alumina, carbon, columbium, molybdenum alloys (e.g., molybdenum rhenium, TZM), or tungsten. Energizer materials may also include composite materials, such as silicon carbide reinforced silicon carbide, silicon carbide reinforced silicon nitride, carbon reinforced silicon carbide, and carbon reinforced carbon. An energizer that is to be used in an oxidizing application may also include an appropriate coating to protect the base material.

Figure 24:
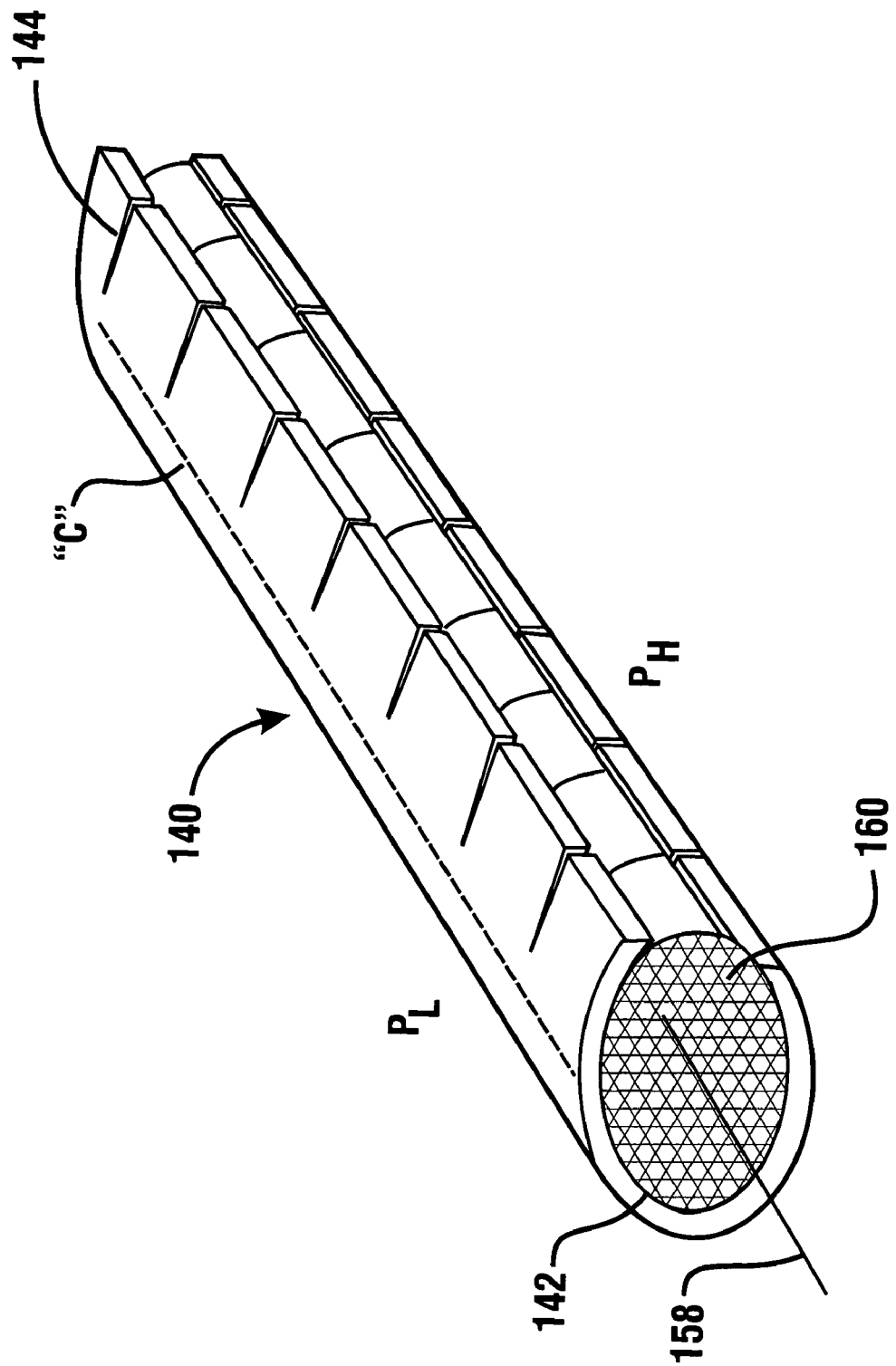
FIG. 24 shows the seal of FIG. 22 with a flow-blocking core element inserted therein.

In certain sealing applications, flow along the longitudinal axis of a seal may need to be mitigated. FIG. 24 shows a flow-blocking core element 160 inserted inside of the sealing element 142. The positioned core element 160 is able to lessen the flow along the longitudinal axis 158 of the seal 140. The flow-blocking core element 160 can comprise braided, knitted, or woven textile structures, and it may contain batting and/or fibrous insulating material (e.g., Saffil). In still other sealing applications, a spring element or energizer 150 may be combined with the flow-blocking core element 160.

An exemplary form of the invention includes a resilient, flexible, pressure-activated, high-temperature seal and method of sealing between adjacent structures. The seal is capable of sealing the interface between two structures through repeated heating and loading cycles, and preventing parasitic flow between adjoining elements that move relative to one another either within or out of plane. The exemplary seal provides resiliency and flexibility while maintaining fluid flow-blocking ability under high temperature and pressure conditions. The seal is capable of being made of high temperature ceramics, composites, and superalloy metals for use at high temperatures.

The flexible C-shaped elements enable the seal to be inflated (or flexed) by the pressure differential across the seal so as to increase sealing contact with the opposing surfaces of the adjacent structural element. Exemplary forms of the seal can be linear and can be cut to length to fit a variety of seal applications and to seal adjacent surfaces having varied contours. The seal element blocks flow, the slots or similar features add to seal flexibility, and resilient material in the seal core adds to resiliency. The exemplary seal also achieves resiliency through pressure activation. The resiliency is through pressure activation of the C-shaped seal. The source of the pressure activation can be the fluid pressure that the seal is sealing against or an alternative pressure source. The resiliency of the exemplary seal structure enables it to seal a gap between adjacent structures that move relative to one another within or out of plane.

In an exemplary seal, the C-shape enables the seal to be placed in a sealing position in a compressed state. The positioned seal can provide a spring action acting to bias the seal radially outward toward a more open "C" (e.g., biased toward the seal interior expanding). The pressure acting on the inside surface of the C-shaped elements also acts to bias the elements of the seal in an outward direction against the adjacent surfaces. Thus, the exemplary seal can have both the force of the spring action of the seal elements and the force of the pressure differential acting on the seal. These combined forces provide additional sealing effectiveness. Therefore, a seal positioned in a gap between adjacent structural components can be biased (e.g., expanded) into tight sealing contact against such components. The expandable (pressure-activated) seal is operative to more effectively seal a gap between structures that can move relative to one another in a variety of directions, e.g., move away from each other in a direction parallel to a common plane, and move away from each other in a direction transverse or perpendicular to the common plane. In an exemplary embodiment with multiple layers the use of sealing elements with different coefficients of thermal expansion, as previously discussed, can further result in a thermal-activated seal, and additional sealing effectiveness. An exemplary seal can comprise both pressure-activated and thermal-activated sealing features.

The exemplary seal structures and methods described herein may have applicability in many industries. The seal embodiments may be used to seal gaps between flanges in substantially any industry. For example, an exemplary seal can be used in the ground-based power, aerospace, chemical, and automotive industries, amongst others. An exemplary seal may also be used to seal interfaces in space vehicle propulsion system joints, such as rocket nozzle ramps, ramps in variable exhaust systems, aerospike engine joints, ramjet-scramjet engines, re-entry vehicle control surfaces, payload bay doors, landing gear doors, and leading edge-to-wing attachment structures. An exemplary seal employing the principles hereof may also be used to seal aerospace vehicle thermal protection system (TPS) panel joints or reusable launch vehicle (RLV) engine structures. In addition, exemplary seal structures can be used in (gas) turbine engines and exhaust nozzles. Seals employing the principles described herein can be used to seal turbine vanes and other high temperature structures in advanced subsonic and supersonic aircraft turbine engines and ground-based turbine engines. Other turbine engine applications include sealing interfaces in combustor cases, nozzle liners, and combustor-to-nozzle joints. Exemplary embodiments can also be used as compliant mounts and/or as seals between advanced structural materials such as intermetallics (e.g., nickel-aluminides, titanium-aluminides, etc.), carbon-carbon composites, and ceramic matrix composites, such as those used in advanced aerospace systems.

As an example of chemical environment usage, exemplary embodiments can be used as high temperature seals in catalytic process equipment. Other high temperature applications include sealing furnace doors and expansion joints where thermal growth of furnace panels is encountered. Embodiments may also be used to seal joints in high temperature molds or to seal locations in continuous casting processes. Of course some embodiments may also be used in low temperature applications. For example, seals of exemplary embodiments may be used in any application in which continuously molded lip seals are unable to provide required flexibility or resiliency. Exemplary embodiments can also provide longer service lifetimes, which can result in reduction of maintenance and replacement costs.

Thus the new seal apparatus and method of exemplary forms of the present invention achieve at least one of the above stated objectives, eliminate difficulties encountered in the use of prior devices and arrangements, solve problems, and attain the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. It is to be understood that various modifications and enhancements may be made without departing from the spirit and scope of the invention.

Further, in the following claims any feature that is described as a means for performing a function shall be construed as encompassing any means capable of performing that function and shall not be limited to the particular means shown in the foregoing description or mere equivalents.

Having described the features, discoveries, and principles of the invention, the manner in which it is constructed and operated, and the useful results attained; the new and useful structures, devices, elements, arrangements, parts, combinations, systems, equipment, operations, methods, and relationships are set forth in the appended claims.

We claim:

1. An apparatus including:
   a resilient seal adapted to be positioned between a relatively high fluid pressure and a relatively lower fluid pressure, wherein the seal comprises:
   at least two seal elements,
      wherein each seal element is located radially adjacent to another seal element,
      wherein each seal element includes a sheet having a pattern comprising slots formed by removal of material from the sheet and strips of sheet material extending between the slots,
         wherein at least some of the strips of an outer seal element of the at least two seal elements respectively overlap at least some of the slots of an adjacent inner seal element of the at least two seal elements,
         wherein at least some of the strips of the inner seal element respectively overlap at least some of the slots of the outer seal element,
   at least one barrier strip attached to an outer surface of the inner seal element, wherein the at least one barrier strip is respectively aligned with at least one slot of the outer seal element, wherein the seal is responsive to a sealing activation pressure differential across the seal to cause the seal elements to be biased in a radially outward direction.

2. The apparatus according to claim 1 wherein at least some of the strips of each seal element respectively overlap slots of an adjacent seal element.

3. The apparatus according to claim 2 wherein each slot of each seal element is overlapped by a respective strip of an adjacent seal element.

4. The apparatus according to claim 1 wherein the pattern comprises strips forming one of a generally S-shape configuration, single-sided comb configuration, or double-sided comb configuration.

5. The apparatus according to claim 1 wherein each seal element includes a longitudinal axis, wherein each slot of each seal element is angled at an angle non-perpendicular with the longitudinal axis.

6. The apparatus according to claim 1 wherein the inner seal element comprises a plurality of barrier strips attached thereto, wherein each respective barrier strip is aligned with a respective slot of the outer seal element, wherein the barrier strips provide a barrier to flow through the respective slots of the outer seal element.

7. The apparatus according to claim 1 wherein each seal element comprises a generally C-shaped cross section.

8. The apparatus according to claim 7 wherein each sheet of each seal element is rolled into a generally C-shape.

9. The apparatus according to claim 8 wherein each sheet comprises a metal sheet.

10. The apparatus according to claim 7 wherein the seal provides a resilient biasing spring action in opposition to radially compressive force.

11. The apparatus according to claim 7 wherein the C-shaped cross section of the seal element extends in an arc greater than 180°.

12. The apparatus according to claim 1 wherein the adjacent seal elements are operatively arranged to be biasingly engaged against each other responsive to the sealing activation pressure differential, wherein the seal elements relatively expand to provide resilient sealing engagement with a pair of opposing structure surfaces that are movable relative to one another within or out of a plane.

13. The apparatus according to claim 1 wherein each seal element is in attached engagement with an adjacent seal element.

14. The apparatus according to claim 13 wherein the attached engagement comprises attachment points connecting two adjacent sealing elements, wherein the attachment points form an attachment pattern.

15. The apparatus according to claim 6 wherein the seal comprises a radially innermost seal element, wherein the innermost seal element bounds an inner core volume.

16. The apparatus according to claim 15 wherein the seal further comprises a core structure, wherein the core structure includes a load-bearing structure, and wherein the core structure is located in the inner core volume.

17. The apparatus according to claim 16 wherein the seal comprises a high temperature seal, and wherein the core structure comprises a fibrous thermal insulation material.

18. The apparatus according to claim 1 wherein the seal comprises an outermost seal element, wherein the seal comprises at least one anchor tab in attached engagement with the outermost seal element, wherein the at least one anchor tab is attachable to a respective wall of at least one structural component, and wherein the at least one anchor tab is operable to anchor the seal relative to the at least one wall.

19. The apparatus according to claim 1 wherein the seal is flexibly operative to bend around corners and against adjacent curved surfaces.

20. The apparatus according to claim 1 and further comprising
areas having relatively high and lower fluid pressures,
first and second structural components each having a respective sealing surface,
wherein the first and second structural components are spaced from each other,
wherein the seal is positioned between the high and lower fluid pressure areas and in sealing engagement with each of the sealing surfaces.

21. The apparatus according to claim 20 wherein the seal comprises a seal element having a generally C-shaped cross section having an interior area, wherein the interior area is in fluid communication with the relatively high fluid pressure area.

22. The apparatus according to claim 21 wherein the seal is operative to expand outwardly responsive to the pressure differential across the seal, achieving a seal-activating pressure level.

23. The apparatus according to claim 22 wherein the sealing engagement is responsive to seal expansion.

24. The apparatus according to claim 21 wherein at least two seal elements have different coefficients of thermal expansion, wherein the seal is operative to expand outwardly responsive to thermal-activation of the seal.

* * * * *